(12) United States Patent
Otero et al.

(10) Patent No.: US 9,396,508 B2
(45) Date of Patent: Jul. 19, 2016

(54) USE OF MAP DATA DIFFERENCE TILES TO ITERATIVELY PROVIDE MAP DATA TO A CLIENT DEVICE

(71) Applicant: GOOGLE INC., Mountain View, CA (US)

(72) Inventors: Daniel Otero, Seattle, WA (US); Nicholas Lee, Mountain View, CA (US); James Darpinian, Seattle, WA (US); Jennifer Maurer, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 394 days.

(21) Appl. No.: 13/895,310

(22) Filed: May 15, 2013

(65) Prior Publication Data
US 2014/0340419 A1    Nov. 20, 2014

(51) Int. Cl.
*G09G 5/30* (2006.01)
*G06T 1/00* (2006.01)
*G06T 9/00* (2006.01)
*G01C 21/36* (2006.01)

(52) U.S. Cl.
CPC .............. *G06T 1/00* (2013.01); *G01C 21/3667* (2013.01); *G06T 9/00* (2013.01)

(58) Field of Classification Search
CPC ........ G06T 1/20; G06T 9/001; G06T 21/3682
USPC .......................................................... 345/619
See application file for complete search history.

(56) References Cited

U.S. PATENT DOCUMENTS

| | | | |
|---|---|---|---|
| 5,519,809 A | 5/1996 | Husseiny et al. | |
| 5,864,632 A | 1/1999 | Ogawa et al. | |
| 5,966,135 A * | 10/1999 | Roy | G06F 17/30241 345/619 |
| 6,314,370 B1 | 11/2001 | Curtright | |
| 6,388,684 B1 | 5/2002 | Iwamura et al. | |
| 6,577,714 B1 | 6/2003 | Darcie et al. | |
| 7,142,217 B2 | 11/2006 | Howard et al. | |
| 7,308,117 B2 | 12/2007 | Chitradon et al. | |

(Continued)

FOREIGN PATENT DOCUMENTS

| | | |
|---|---|---|
| EP | 2 078 926 A1 | 7/2009 |
| EP | 2 290 322 A1 | 3/2011 |

OTHER PUBLICATIONS

Mac Aoidh et al., "Personalization in Adaptive and Interactive GIS," *Annals of GIS*, 15(1):23-33 (2009).

(Continued)

*Primary Examiner* — Javid A Amini
(74) *Attorney, Agent, or Firm* — Marshall, Gerstein & Borun LLP

(57) ABSTRACT

To provide map data for rendering map images corresponding to a selected geographic region at a client device, a map server generates a set of base map tiles having vector descriptors, each of which indicates a geometry of a respective map element, in accordance with a non-raster format for rendering a first map image. The map server, at some point, provides the base map tiles to the client device. Upon receiving an indication that a specific map image for the selected geographic region is to be rendered at the client device, the map server further generates a set of difference map tiles that indicate changes to be made to the set of base map tiles and sends the difference map tiles to the client device for use, along with the set of base map tiles, in rendering the requested specific map image.

29 Claims, 8 Drawing Sheets

(56) References Cited

U.S. PATENT DOCUMENTS

| | | |
|---|---|---|
| 7,734,412 B2 | 6/2010 | Shi et al. |
| 7,844,417 B2 | 11/2010 | Du |
| 7,865,301 B2 | 1/2011 | Rasmussen et al. |
| 7,933,897 B2 | 4/2011 | Jones et al. |
| 7,945,546 B2 | 5/2011 | Bliss et al. |
| 8,010,407 B1 | 8/2011 | Santoro et al. |
| 8,014,946 B2 | 9/2011 | Rasmussen et al. |
| 8,041,506 B2 | 10/2011 | Bliss et al. |
| 8,681,176 B1* | 3/2014 | Maurer ............... G01C 21/367 340/995.1 |
| 2002/0113797 A1 | 8/2002 | Potter et al. |
| 2003/0229441 A1 | 12/2003 | Pechatnikov et al. |
| 2004/0217980 A1 | 11/2004 | Radburn et al. |
| 2005/0285876 A1 | 12/2005 | Balaga et al. |
| 2006/0041375 A1 | 2/2006 | Witmer et al. |
| 2006/0074547 A1 | 4/2006 | Kaufman et al. |
| 2006/0074660 A1 | 4/2006 | Waters et al. |
| 2006/0139375 A1 | 6/2006 | Rasmussen et al. |
| 2006/0170693 A1 | 8/2006 | Bethune et al. |
| 2006/0271281 A1 | 11/2006 | Ahn et al. |
| 2006/0293847 A1 | 12/2006 | Marriott et al. |
| 2007/0016651 A1 | 1/2007 | Blagsvedt et al. |
| 2007/0021908 A1 | 1/2007 | Jaugilas et al. |
| 2007/0050340 A1 | 3/2007 | von Kaenel et al. |
| 2007/0098211 A1 | 5/2007 | Walton et al. |
| 2007/0118520 A1 | 5/2007 | Bliss et al. |
| 2007/0176796 A1 | 8/2007 | Bliss et al. |
| 2007/0208498 A1* | 9/2007 | Barker ............... G08G 1/0104 701/117 |
| 2007/0210937 A1 | 9/2007 | Smith et al. |
| 2007/0226314 A1 | 9/2007 | Eick et al. |
| 2007/0245238 A1 | 10/2007 | Fugitt et al. |
| 2008/0016472 A1 | 1/2008 | Rohlf et al. |
| 2008/0109159 A1 | 5/2008 | Shi et al. |
| 2008/0238941 A1 | 10/2008 | Kinnan et al. |
| 2009/0089149 A1 | 4/2009 | Lerner et al. |
| 2009/0113296 A1 | 4/2009 | Lacy et al. |
| 2009/0157718 A1 | 6/2009 | Owen, Jr. et al. |
| 2009/0198767 A1 | 8/2009 | Jakobson et al. |
| 2009/0271718 A1 | 10/2009 | Balaishis et al. |
| 2010/0073391 A1 | 3/2010 | Horowitz et al. |
| 2010/0114941 A1 | 5/2010 | von Kaenel et al. |
| 2010/0118025 A1* | 5/2010 | Smith ............... G06Q 30/02 345/418 |
| 2010/0194784 A1 | 8/2010 | Hoff et al. |
| 2010/0201707 A1 | 8/2010 | Rasmussen et al. |
| 2010/0321399 A1* | 12/2010 | Ellren ............... G06F 17/30241 345/587 |
| 2011/0004830 A1 | 1/2011 | Von Kaenel et al. |
| 2011/0153186 A1 | 6/2011 | Jakobson |
| 2011/0172909 A1 | 7/2011 | Kahn et al. |
| 2011/0177845 A1* | 7/2011 | Fasold ............... G09B 29/007 455/566 |
| 2011/0191014 A1 | 8/2011 | Feng et al. |
| 2011/0208724 A1 | 8/2011 | Jones et al. |
| 2011/0267369 A1 | 11/2011 | Olsen |
| 2011/0306304 A1 | 12/2011 | Forutanpour et al. |
| 2013/0076784 A1* | 3/2013 | Maurer ............... G01C 21/367 345/629 |

OTHER PUBLICATIONS

International Search Report and Written Opinion for Application No. PCT/US2014/038077, dated Sep. 11, 2014.

Bing Maps AJAX Control, Version 7.0 (2011).

Bing Services, "Getting Started with V4 of the API (Part 1)," Microsoft (2011). Retrieved from the Internet on Sep. 26, 2011: URL:http://msdn.microsoft.com/en-us/library/aa907678.aspx.

International Search Report and Written Opinion for Application No. PCT/US2012/057104, dated Feb. 27, 2013.

Neoseeker, "Bing Maps Combines Raster Tiles and Vector Graphics for Enhanced Experience," Neo Era Media Inc. (1999-2011). Retrieved from the Internet on Sep. 26, 2011: URL:http://www.neoseeker.com/news/14507-bing-maps-combines-raster-tiles-and-vector-graphic-for-enhanced-experience.

Sample et al., "Tile-Based Geospatial Information System: Principles and Practices," pp. xi-xiv, 193-203 (Springer 2010).

U.S. Appl. No. 13/237,830, filed Sep. 20, 2011.

U.S. Appl. No. 13/244,808, filed Sep. 26, 2011.

* cited by examiner

USE OF MAP DATA DIFFERENCE TILES TO ITERATIVELY PROVIDE MAP DATA TO A CLIENT DEVICE

FIELD OF THE DISCLOSURE

The present disclosure relates to map rendering systems, such as electronic map display systems, and more specifically to a map rendering system in which map images are rendered using map data provided in an iterative manner as a set of base map tiles and one or more difference map tiles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including desktop computer devices, mobile phones, car navigation systems, hand-held global positioning system (GPS) units, tablet or laptop computers, etc. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the map to a new location, for example. A user in some cases also may select or unselect the display of certain information. For example, the user may operate the appropriate control to turn on the display of bicycle trails, transmit maps, etc.

To render a map image, a display device typically receives raster image data from a dedicated server. For example, a map server may operate on the Internet and provide images in a Portable Network Graphics (PNG) format to various client devices for the specified geographic regions. While raster images are relatively easy to render at a client device, raster image data typically requires a large amount of storage space for a comprehensive map. Also, it is difficult to efficiently manipulate raster images at a client device. For example, to zoom in on a selected region, either new raster image data is retrieved from the server, or the available raster image data is enlarged with a noticeable loss in quality. To alleviate this issue, some mapping systems provide mapping data from the map server to the client device in the form of vector graphics data. Generally speaking, vector graphics data describes or specifies various features to be included in a map, and a graphics engine on the client device processes the vector graphics data to produce a map image using various common techniques.

In any event, most web based mapping services send map data from a server to a client as small image tiles, typically in the form of raster image data tiles or vector image data tiles. Each image tile covers a predetermined geographic region and specifies the exact image to be displayed, either using raster or vector graphics image data. Moreover, many client-server mapping applications provide a user with many different views of the same basic map data. These views may, for example, provide driving-focused maps, bicycling maps, terrain maps, transit maps, business-focused maps, etc. When the user wants to switch to another map view (e.g., a transit map view) of a particular geographic location, the client application requests a whole new set of map tiles for the same location, but specifying the styling and data differences to be included in the new map view (e.g., including transit lines, with reduced emphasis on roads, etc.). Typically however, all or most of the available map views share most of the same data. For example, the land formations, the lakes, the roads, etc., stay the same between all views, but each view may include a few additional features, may have a few features removed and/or may have a few features that are displayed in different manners or styles. In fact, in most cases, the majority of the map data (in terms of bytes of storage) in these different views is common. Thus, if a mapping application allows the user to switch between different map views for the same geographic region, most of the data sent from server to client is actually redundant with data the client device already has received. This fact can cause a number of problems, including high loading latency, high rendering latency on the client device, high serialization latency on the server, and forced reduction of data detail to avoid these problems.

SUMMARY

In an embodiment, a computer-implemented method for providing map data to a client device includes generating a set of base map tiles associated with a particular region, wherein the set of base map tiles, when used to render a map image renders a base map image for the particular region, and wherein each base map tile includes one or more vector descriptors that indicate a geometry of one or more respective map elements for the base map image in accordance with a vector graphics format. The method further includes causing the base map tiles to be transmitted to the client device via the communication network. The method also includes receiving an indication that a map image for the selected geographic region that is different than the base map image produced using the set of base map tiles is to be rendered at the client device, and generating a set of difference map tiles indicating one or more differences between the map image to be rendered and the base map image. The differences may be specified using vector descriptors, each of which corresponds to a respective map element that is (1) to be rendered in the map image but is not in the base map image, (2) not to be rendered in the map image but is in the base map image, and/or (3) to be rendered using a different style, layer or other feature in the map image than that specified in the base map image. The method may then cause the set of difference tiles to be transmitted to the client device via the communication network for rendering the map image using.

In one embodiment, a computer-implemented method for providing map data to a client device via a communication network includes generating one or more base map tiles, each base map tile including a plurality of vector descriptors for rendering and displaying, at the client device, a first map image for a selected geographic region, wherein each vector descriptor indicates a geometry of a respective map element in accordance with a vector graphics format, and causing the one or more base map tiles to be transmitted to the client device via the communication network. The method further includes receiving an indication that a second map image for the selected geographic region is to be rendered at the client device, wherein the second map image is different from the first map image but includes a region covered by at least one of the base map tiles and generating a set of difference map tiles that define a difference between the first map image and the second map image to be displayed. The set of difference map tiles includes one or more descriptors, each of which corresponds to a change in a map element as rendered in the second map image as compared to the first map image. Moreover, the method causes the set of difference map tiles to be transmitted to the client device via the communication network for rendering and displaying the second map image using at least some of the information in the one or more base map tiles and the set of difference map tiles.

In another embodiment, a computer-implemented method for providing map data to a client device via a communication network includes generating one or more base map tiles, each base map tile including a plurality of vector descriptors associated with a first map image for a selected geographic region, wherein each vector descriptor indicates a geometry of a respective map element in accordance with a vector graphics format and generating a set of difference map tiles that define a difference between the first map image and the second map image to be displayed at a client device. Here, the set of difference map tiles includes one or more descriptors, each of which corresponds to a change in a map element as rendered in the second map image as compared to the first map image. The method also causes the one or more base map tiles to be transmitted to the client device via the communication network and causes the set of difference map tiles to be transmitted to the client device via the communication network for rendering and displaying the second map image using at least some of the information in the one or more base map tiles and the set of difference map tiles.

In still another embodiment, a tangible non-transitory computer-readable medium has instructions stored thereon that, when executed by one or more processors, cause the one or more processors to receive, from a client device, an indication that a particular map image for a selected geographic region is to be rendered at the client device, and to define one or more base map tiles for the selected geographic region, each base map tile including a plurality of vector descriptors associated with a first map image for the selected geographic region, wherein each vector descriptor indicates a geometry of a respective map element in accordance with a vector graphics format. Still further, the instructions operate to generate a set of difference map tiles that define a difference between the first map image and the particular map image to be rendered at a client device, the set of difference map tiles including one or more descriptors, each of which corresponds to a change in a map element as rendered in the particular map image as compared to the first map image. Additionally, the instructions cause the set of difference map tiles to be transmitted to the client device via the communication network for rendering and displaying the particular map image using at least some of the information in the one or more base map tiles and the set of difference map tiles.

In yet another embodiment, a method for implementation in a computing device for generating map images includes receiving, via a communication network, a plurality of base map tiles associated with a first map image for a selected geographic region, each base map tile including one or more vector descriptors that indicates a geometry of a respective map element in accordance with a vector graphics format and also receiving, via the communication network, a set of difference map tiles for rendering a second map image for the selected geographic region, each of the set of difference map tiles including one or more indications of a modification of a vector descriptor in one of the plurality of base map tiles. The method then renders the second map image using the plurality of base map tiles and the set of difference map tiles and causes the second map image to be displayed via a user interface.

DETAILED DESCRIPTION

Figure 1:
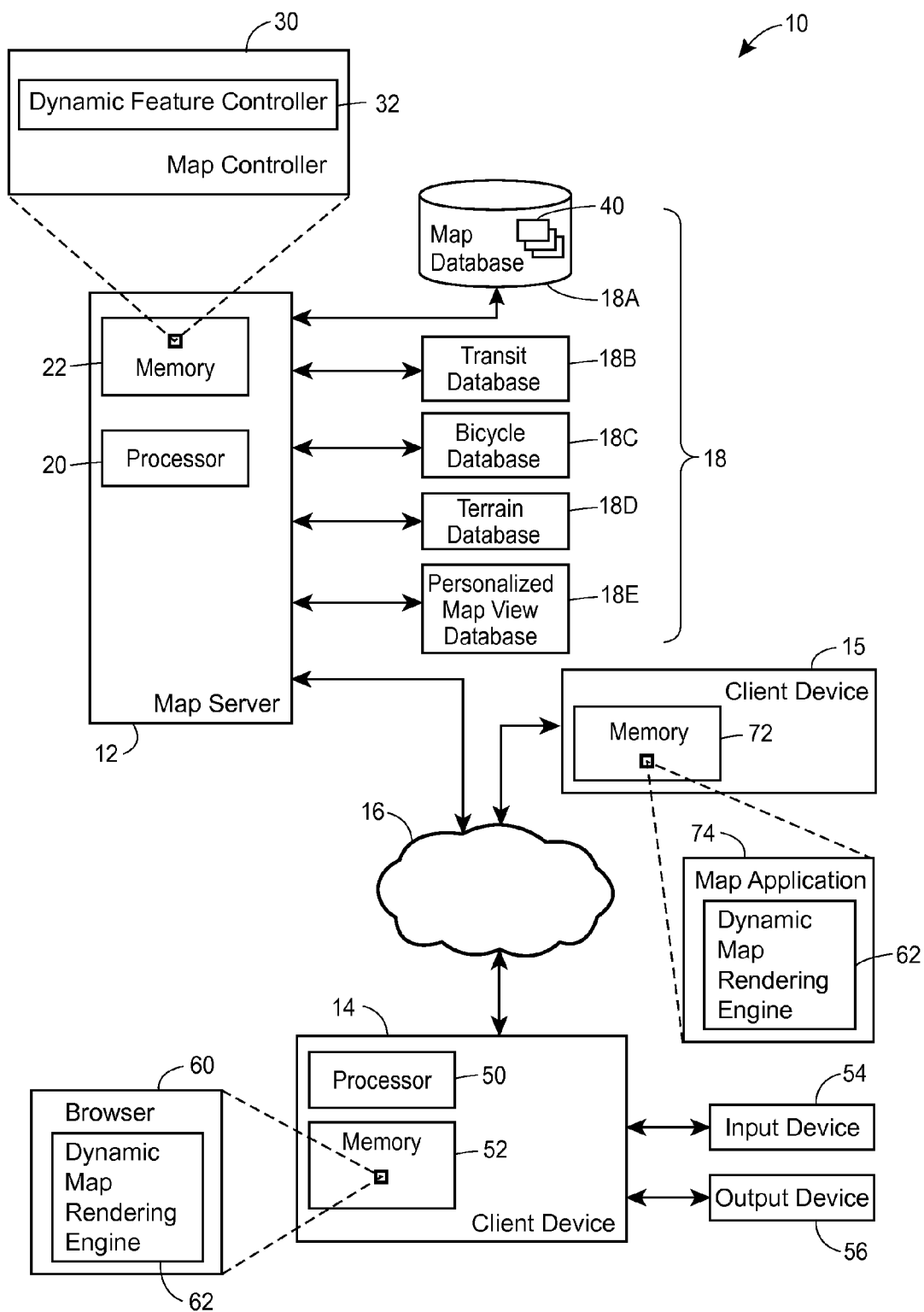
FIG. 1 is a block diagram of a mapping system in which a map server iteratively provides map data to a client device for rending a map image in the form of a set of base map tiles and a set of difference map tiles.

A map server device communicates with a map client device to efficiently provide map data for rendering map images on the client device using a set of base map tiles having basic map feature data and a set of difference tiles defining changes to be made to the basic map feature data within the basic map tiles upon rendering the map at the client device. In some cases, the map server first provides map data to a client device, such as desktop computer, a laptop, a tablet device, a mobile phone, etc., for rendering a first map image corresponding to a certain area or geographic region as a set of one or more base map tiles and then later provides modification data to the client device in the form of difference tiles for rendering a second, different map image (e.g., a traffic map image, a transit map image, etc.) corresponding to the same geographical area. The client device then may render the second map image using the base map data previously provided for rendering the first map image and the modification data in the form of the difference tiles, so that the map server need not provide map data used in rendering both the first map image and the second image to the client device more than once. Depending on the scenario, the modification data within the difference map tiles may include one or more additions to the data or features within previously provided base map tiles, deletions of one or several portions or features of the previously provided base map tiles, and/or modifications of one or several portions or features of the previously provided base map tiles, such as modifications in styles, layers (depths) etc. associated with the features are to be rendered. In some cases, the map server device may provide both the base map tiles and the difference map tiles in response to a single map request when, for example, the user at a client device first requests a map image for a particular geographic region that is not the base map image.

In one case, the map server may provide the base map tiles in a non-raster format, such as in a vector graphics format, and the client may interpret some or all of the map data to generate the first map image. In some cases, the map server may provide one or more of the base tiles in a hybrid format where map data is included with both raster data (such as a raster background) and vector data. Additionally, the map server may provide the client device with one or more difference tiles in a raster format, a non-raster format or a hybrid format, and the client device may process the difference tiles to identify the changes to be made to the base map tiles. The client device may then render the second map image as a new or modified image based on the data within the original base map tiles and the difference map tiles covering the same geographic region. Either or both of the base map data tiles and the difference map data tiles may include style data that is used to specify various stylistic features to be used when rending the base map data or the modified map. In this case, the difference map tiles may include or specify a new or different set of style data to use to render the map image.

To render the base map image, the client device may request map data from the map server via a communication network, and the map server may, in response, provide the base map data that describes map content according to a vector graphics format. For example, the base map data may specify various geometric shapes (e.g., using mathematical descriptions of points and paths connecting the points) and indicate how these shapes should be positioned for rendering various map elements such as roads, buildings, parks, bodies of water, etc. In this case, rather than specifying each pixel that makes up a raster image of a line segment, a vector-based description of the line segment may specify the two endpoints of the line segment and indicate that the two endpoints are connected by a straight line. Style data provided as part of the base map tile may specify the width or color or drawing texture (solid, dotted, etc.) of the line or other feature element. Vector-based descriptions of map elements may be referred to herein as vector descriptors or simply vectors, and a set of one or several vector descriptors may be referred to as vector data. Further, an individual map element (e.g., a building) or an aggregation of several map elements (e.g., buildings, parks, bicycle paths, and pedestrian paths of a college campus) in some scenarios may define a map feature (or simply a feature). In an embodiment, a map feature is assigned a unique identifier which the map server and the map client may utilize for identification. In general, a map feature may be described using one or more vector descriptors.

The client device may request map data for rendering a map image in response to respective user commands, for example. The user commands may indicate a selection of a different map type, a different zoom level, etc. According to an example scenario, a user selects a geographic region and a basic map type, e.g., the type of a map that illustrates roads, streets, major landmarks, etc. The client device generates a request for rendering a map image and transmits the request to the map server, which in response provides map data including a set of one or more base map data tiles, with the map data in each base map data tile being in a vector graphics format (or other non-raster format suitable for rendering a raster image at the client device). The map data may include several vector descriptors and, in some cases, may include additional data such as style data, label data, layer data, etc. More specifically, label data may include characters in the American Standard Code for Information Interchange (ASCII) format, a Unicode format, or any other suitable character format. Layer data may include data specifying a relative layer or depth of a map element and thus specifies which map elements are to be rendered on top of other map elements within the map image. The client device then interprets the map data to render the map image and displays the map image on a display device.

To continue with the scenario above, the user then may select a transit map for the same geographic region, and the client device in response may generate an indication that a new map image corresponding to a transit map is to be generated and transmit the indication to the map server. According to one implementation, the client device generates a request for map data of the new type (e.g., "provide map data for a transit map of region R"), and the map server checks previous communications with the client device to determine what base map tiles or base map data was previously sent to the client device, and therefore is already available at, the client device. In another implementation, the client device specifies what kind of map data for the selected region is already available at the client device in addition to requesting map data of the new type (e.g., "provide map data for a transit map of region R, given that I already have map data for a basic map of region R at the same zoom level"). The map server in this case does not need to know what base map data or base map tiles, if any, were previously sent to the client device. More generally, a history of transactions between a map server and a client device may be maintained by the map server and/or the client device.

The map server then may determine which map elements and labels must be added to, removed from, or modified in the base map data already available at the client device. For example, the map server may determine how a base map for a certain region and a certain zoom level differs from a transit map for the same region and the same zoom level, and may generate an appropriate modification indication in the form of one or more difference map tiles. For example, the difference map tiles may include vector descriptors for features to be added to the base map tiles, such as rendering subway lines not included in the base map image, may describe certain features of the base map tiles to be removed and/or may describe certain features of the base map tiles to be changed, such as different styles (e.g., widths, fonts, colors, shading, etc.), levels, and/or labels to be used in the map image to be rendered on the client device as compared to the base map image. The map server then provides the modification data in the form of a set of difference map tiles for use along with the base map tiles to render the transit map image at the client device using, at least partially, the base map data tiles and the difference map data tiles. Thereafter, when the user selects yet another map view of the same geographic region, the client device may request this view from the map server, which may determine the differences between the newly selected map image view and the base map image provided in the base map tiles to generate another set of one or more difference tiles. This new set of difference tiles may then be provided to the client device which generates the new map view based on the original base map tiles and the new set of difference tiles.

These and other example scenarios in which map data for rendering map images is efficiently provided to a client device are further discussed with reference to the accompanying drawings. Some of the figures may have been simplified by the omission of certain elements for the purpose of more clearly showing other elements. Such omissions of elements in some figures are not necessarily indicative of the presence or absence of particular elements in any of the exemplary embodiments, except as may be explicitly delineated in the corresponding written description.

Referring now to FIG. 1, a map display system 10 may be used to efficiently transfer map data from a map server device to a map client device using base map data tiles and difference map data tiles iteratively provided to a client device. As illustrated in FIG. 1, the system 10 generally includes a map server 12, one or more client devices 14 and 15 communicatively coupled to the map server 12 via a network 16 (which could be made up of one or more different communication networks), and a map database 18 communicatively coupled to the map server 12. The network 16 may be a wide area network (WAN) such as the Internet, a local area network (LAN), or any other suitable type of a network. Depending on the embodiment, the map database 18 may be coupled to the map server 12 via the network 16 or via another communication link as illustrated in FIG. 1. Still further, the map database 18 may include multiple different databases or map services used to produce a map. For example, the database 18 may include a base map database 18A that stores base map tiles for various geographical regions for any number of zoom level. Moreover, the database 18 may include one or more map services databases 18B-18E. Here, for example, the map database service 18B may store transit map data defining transit data to be added to the base map data as stored in the database 18A to provide transit map views of geographical regions stored in the base map database 18A. Likewise, the map database services 18C and 18D may store bicycle and terrain map data, respectively, that enables the map server 12 to produce bicycle trail map views and terrain map views for various geographical regions of map data stored in the base map database 18A. Still further, in one embodiment, the map database services 18E may store personalized map data content for various users. In particular, users may personalize map data by adding information to various map tiles, refocusing information by changing map styles, setting preferences (such as always showing points of interest, bicycle paths, traffic data, etc.) In these cases, the personalized map data or preferences may be stored in the map database services 18E for later retrieval and use when displaying maps to users, as will be discussed in more detail below. Of course, the database 18 could including any number of map database services for any other types of map data and these database services could be stored in the same or in different server devices. Alternatively, all of the additional map data stored in and provided by the map service databases 18B-18E could be stored in the database 18A. Moreover, for simplicity, only one instance of the map server 12 and the map database 18 is illustrated in FIG. 1. However, in other embodiments, the system 10 may include more than one map server 12, more than one map database 18 and any number of client devices 14, 15.

The map server 12 is illustrated in FIG. 1 as including a processor 20 and a computer-readable memory 22 that stores a map controller 30 in the form of computer instructions, for example, that may be executable on the processor 20 directly (e.g., as compiled code) or indirectly (e.g., as a script interpreted by another application executing on the processor 20). The computer-readable memory 22 may include volatile memory to store computer instructions and data on which the computer instructions operate at runtime (e.g., Random Access Memory or RAM) and, in an embodiment, persistent memory such as a hard disk, for example. The map controller 30 may include a dynamic feature controller 32 that generates vector graphics data for various map elements and/or map features including one or more map elements that are provided as map content to the client devices 14 and 15 in the form of base map data tiles. The dynamic feature controller 32 also may be configured to determine the difference in a vector-based description of a map image relative to another map image corresponding to the same geographic area or region, generate an appropriate modification indication as a set of difference map tiles, and provide the modification indications or difference map tiles to the client devices 14 and/or 15. In other words, rather than providing a complete vector-based description of a map image, the dynamic feature controller 32 can efficiently provide a description of modifications of a previously provided vector-based description of another map image.

Generally speaking, the system 10 of FIG. 1 may create and use difference map tiles (each of which is essentially a partial map tile in that each difference map tile specifies only a portion of the map image to be rendered on the client device in the region covered by the map tile) to create map images. In particular, when the difference map tiles are combined with another tile in the form of a base map tile at the client or map rendering device, the system is able to produce the desired final map view (e.g., transit view). In one case, the difference map tiles contain only the set of modifications that are required to change the base map tiles into the desired final tile or map image.

In one embodiment, each difference map tile includes two fundamental components, in the form of a set of tile edits and a set of style specifications. Here, each of the set of tile edits specifies a single operation against the base map tile that defines how to convert some geometry in the base map tile into that required by the desired final state or map view to be created using the difference map tiles. The tile edits may include the addition of features, the removal of features and/or the change of properties of features, such as a change of the rendering level of a feature, the label of a feature, etc. The new set of styles specifications indicates the colors, font sizes, line widths, etc. that should be used to achieve the final desired look as compared to the styles used in the base map image or base map tiles.

More particularly, tile edits may be specified as individual geometry modification operations that must be performed on a base map tile to transition the base map tile to the desired final state for rendering the desired map image or view. These operations may, in one case, work on render operations or "render ops" within the map tile (i.e., individual pieces geometry such as a strip of road, a label, a polygon representing a lake, etc.) and generally come in three types, including the removal of features, the addition of features or the changing of feature properties.

More particularly, a render op as specified in the difference map tile may operate to remove some of the geometry in a base map tile that may not be relevant in the desired final map tile or map image. For example, in terrain mode, a lot of roads become superfluous and need to be stripped out of the terrain map view as compared to the base map view. A difference map tile for a terrain image view might include a single remove operation for each road render op that needs to be removed from the base map tile to achieve the terrain map view effect.

In another example, a render op may add a map feature to a base map tile as, in many cases, a particular map view will need additional data or features over those found in the base map image. For instance, a transit map view would need to add prominent transit lines to the map image associated with the base map tiles. A transit difference tile would, in this case, include add operations for each transit line that needs to be drawn. Each such add operation may specify three things, including the new geometry to be added, the visual style of that geometry, and below what render op in the base tile the new render op should be added (so that the system can control ordering of render ops in the final map tile).

In still another example, a render op may provide a restyle operation. For example, in map views that are interactive, it is often desirable to change the presentation of render ops without affecting all other render ops like it. For instance, if a user interacts with a business, the system may want to change the business label and icon to reflect having been selected. The system, however does not usually want to change the presentation of all of the other businesses around the selected business. In this case, the system can issue a single restyle operation on the selected business and define a new visual style for just that business. In other cases, restyle operations may be applied to all of the elements within a particular feature, such as all of the elements within a park, a building, associated with a bike path or a walking path, etc.

Still further, as noted above, each difference map tile may include a set of styles. In particular, in one example, every base tile may include a "style table" that includes the visual style parameters of every render op listed in the tile. When a difference tile is sent from the server device to the client device, the difference tile may also include a new style table for everything that will be visible in the final composed tile. While it may, in some cases, be desirable to specify only the changes in the base map tile style table within the difference tile, it is also possible to simply provide a whole new style table as part of the difference map tile, as style tables are typically small in size. In fact, because of the relatively high complexity of such a style difference mechanism, and because style tables are typically tiny in comparison to the geometry and feature data within the difference and base map tiles, it is typically not necessary to attempt to optimize the sending of style changes in a difference map tile. Still further, style tables may be configured such that, if a value is not included in the style table, the value of the style table entry is treated as an empty style (e.g., not to be rendered). Conversely, style tables may be configured such that, if a style is not included in the style table, the style table value to be used for that style table entry is the style table value for that entry as found in style table of the base map tile.

In any event, putting all the above described elements together, as long as both the client device and the server device agree on what map tiles to use as the base map tiles, the server device can create and send, and the client device can request, receive and process difference map tiles that simply specify changes to the base map tiles that have already been sent to the client device to enable the client device to render new or different map views of a particular geographic region. More particularly, the first time the client device wants tiles for a non-base mode or non-base map view (e.g., a transit map view), the client device will need to request all of the base tiles from the server that it does not already have, along with difference map tiles which transform the base map view into the transit map view. Thus, in this case, for every tile that would normally have been requested without difference map tiles, a client device that uses a difference map tile system will request twice the number of tiles: one base map tile and one difference map tile. However, once a set of base map tiles for a particular geographic region have been sent to and received by the client device, the client device merely needs to request or receive the difference map tiles for a new map view for that region. As difference map tiles will generally be small in size, as compared to the base map tiles, this system will send and receive less data upon the request of multiple map views for the same geographic region. That is, the base tiles need be requested only once and then stored henceforth at the client device so that, while the first time the base tiles are needed, twice the number of tiles may need to be requested, thereafter, the base tiles will already be available on the client and so only difference tiles need to be requested. Moreover, if the client device initially displays the base map, for instance, the switch to a transit map view will only require the difference map tiles to get from the base map view to the transit map view. Still further, the use of base tiles and difference tiles enables a mapping system to easily deal with personalized map data, or to provide the ability for users to personalize map content, features, display settings, etc. to be used to display maps in the future. In particular, user modifications to maps, additions to maps, map preferences, display settings, default map views, etc., can be implemented and stored as a set of difference tiles and provided to users, along with the set of base tiles to which the user preferences in the form of difference tiles are to be applied, to thereby alter a set of base tiles to personalize map content for a user. The user map preferences, settings or other personalized map data may be stored at a map server device in the form of difference tiles (tied to or associated with a particular user) and thus can be cashed at the server without requiring a lot of memory or space. In this case, the same set of base tiles for a particular region can be sent to each user, along with different user specified or user specific difference tiles that are to be applied to the base tiles, to enable personalized map data to be cashed and provided to the user. Alternatively, personalized difference tiles may be created and stored on user devices, such as mobile phones, computers, laptops, tablets, etc. and applied to the base tiles as those base tiles are received at the client device that is implementing the mapping application.

Generally speaking, the rendering system at the client device may combine the base tiles and the difference tiles and may then render the combination to the user interface screen in any desired manner. However, the client device may perform this rendering in a manner that does not wipe out all of the data that has already been prepared for display of the base map tiles so as to reduce rendering operations when changing from a base map view (with no difference tiles) or from a first map view created using one set of difference tiles to another map view created using a different set of difference tiles. Moreover, a system using the techniques described above results in vastly improved performance at all levels of the architecture as it reduces serialization work on the server, reduces bandwidth required and transfer time across the network, and reduces preparation time on the client.

Referring again to FIG. 1, the map database 18A may store a set of base map data tiles 40 defining map data to be used for each of a number of different geographic regions at each of a number of zoom levels. The base map data tiles 40 may, for example, store or describe map data in a vector graphics format, but could instead describe data in a raster image format. The map server or map controller 30 can provide some set of these base map data tiles 40 to the client device 14 the first time the client device 14 requests map data for a particular geographic region. However, when the client device 14 requests a map view other than the base map view for the particular geographic region, the map server 12 may obtain the additional data from, for example, one or more of the services 18B-18E, and the dynamic feature controller 32 may generate a set of difference map tiles to be sent to the client device 14 describing the manner in which the base map tiles for the particular geographical region are to be modified to produce the new map view. In some cases, the difference map tiles may be created and sent along with the base map tiles for a particular geographical region when the client device 14 first requests a map view that is different than the map view associated with the base map tiles. In other cases, the map server 12 may create and send the difference map tiles at a later time, such as when the client device 14 requests an additional map view for a particular geographical region after requesting and displaying the map view associated with the base map tiles for that geographical region.

Thus, to make transmission of map graphics between a server and a client more efficient, the server 12 provides a set of basic map data tiles, in a vector format, to the client device 14. When the user requests the display of new map elements or otherwise changes the map view at the client device 14, the server 12 provides a description of the differences between the base map data tiles and the map tiles the user presently wishes to see. For example, the server 12 can specify which elements should be deleted, which elements should be added (and the geometry of these elements), which new styles should be applied to some of the previously provided map elements (and what the visual attributes of these styles are), etc. As such, the server 12 generates difference map tiles rather than new map tiles that repeat significant portions of the base map data tiles previously provided to the client device 14.

To generate a modification indication or a difference tile, the dynamic feature controller 32 may compare a serialized representation of the vector data corresponding to a certain map image or map to a serialized representation of the vector data corresponding to the map image provided by the base map date tile(s). For example, the dynamic feature controller 32 may request vector data for a base map for a region R at zoom level Z, and, in response, the map server 18A may provide a series of vector descriptors $V_1, V_2, V_5, \ldots V_N$, defining one or more base map data tiles. At another time, the dynamic feature controller 32 may request vector data for a transit map for the region R at zoom level Z, and the map server 18 in response may provide a series of vector descriptors $V_1, V_3, \ldots V_L$ defining the map view for the region R with the transmit map information. Based on the two sets of vector descriptors, the dynamic feature controller 32 may determine that, for the region R at zoom level Z, (i) both the basic map and the transit map include a map element corresponding to vector descriptor $V_1$, (ii) the basic map but not the transit map includes map elements corresponding to vector descriptors $V_2$ and $V_5$, and (iii) the transit map but not the basic map includes a map element corresponding to vector descriptor $V_3$. The dynamic feature controller 32 may generate a modification indication or difference tile to indicate that in order to generate a transit map image using the vector data previously provided for rendering a base map image from the base map tiles, vector modifier $V_3$ is added to the previously provided vector data, while vector descriptors $V_2$ and $V_5$ are removed from the previously provided vector data. More specifically, the dynamic feature controller 32 may generate a modification indication or difference tile that includes one or more add indications and one or more remove indications, each of which may identify an operation (e.g., add, remove) and an operand (e.g., a vector descriptor, a map feature or map element).

Further, in some embodiments, the dynamic feature controller 32 may determine that although a certain map element is rendered when generating both the base map image and the additional map image, one or more properties of the map element must be modified to reuse the map element in rendering the additional map image. For example, some or all map elements may be associated with respective depth values indicative of positioning of these map elements relative to other, partially or fully overlapping, map elements in the same area. As a more specific example, a map element that depicts a road segment and corresponds to a vector descriptor $V_i$ may be rendered at a depth $D_1$ in a basic map image but rendered at a depth $D_2$ in a transit map image. In this scenario, dynamic feature controller 32 may generate a modification indication that indicates that the depth associated with vector descriptor $V_i$, previously provided to the client device 14, should be updated to depth $D_2$.

Still further, in addition to vector data, the dynamic feature controller 32 may provide label data for the added or modified map features as a part of the modification indication or, alternatively, as a separate indication. The label data may include characters in any suitable format and, in some implementations, identifiers of map features or groups of map features to which the corresponding labels belong.

In another embodiment, the map controller 30 and, in particular, the dynamic feature controller 32 may generate difference tiles directly based on information sent from one or more of the services databases 18B-18E without comparing this information to the map data within the base map data tiles provided by the base map database 18A. In some cases, the map services databases 18B-18E may provide transit data, bicycle data, terrain data, personalized map data (for example) in the form of a description of differences or modifications to be made to the base map data tiles in the base map data sever 18A instead of providing a complete raster or vector graphics description of a map region for which a new map view is requested. In this case, the dynamic feature controller 32 may generate the difference tiles for a particular geographical region based on the difference descriptions provided by the map services databases 18B-18E instead of comparing vector or raster graphics for entire tiles associated with a base map view (from the base map database 18A) and an additional map view (such as a transit map view) of a geographical region to generate the difference tiles to be sent to the client device.

In some embodiments, in addition to vector data, the map controller 30 may provide style data that indicates how vector data should be rendered. More particularly, style data may describe such visual characteristics or properties as line thickness (e.g., width in pixels), line color, line shading or style, one or more fill colors, etc. In an embodiment, style data is provided for various visual styles that may be applied to the vector data. The map server also may specify which visual styles the client device should apply to various vector-based descriptions of map elements (also referred to herein as vector descriptors or simply vectors). Further, in some embodiments, the map server indicates which visual style applies to a vector-based description of a map element for a particular map type, such as terrain, transit, traffic, bicycle trail, etc. Style data may also be used and stored as part of cached personalized map data to indicate the various styles to use for different users at certain map locations. To this end, several styles, each identified by a respective unique style identifier, may be defined. In one case, a style table may be created for a particular map view to indicate the style values to be applied to the various lines, areas, and other features for that view. In this case, each base map tile may have a style table or set of styles associated therewith for the base map view and this style table may be sent to the client device as part of or along with the base map tiles when the base map tiles are sent to a client device. As such, difference tiles created by the by dynamic feature controller 32 in this case may include a new style table for application to the base map tiles (or for application to modified base map tiles) at the client device to produce the modified or new map views.

In any event, the map controller 30 may provide map data for a certain geographic region and zoom level in a non-raster format, such as vector data, to the client device 14 in a single electronic message or a series of electronic messages, depending on the embodiment. Generally speaking, these electronic messages may have one or more map tiles therein. Further, in an embodiment, the map controller 30 generates map data as a set of map tile descriptors, such that each map tile descriptor describes a map tile, i.e., a portion of a map image of a certain size (e.g., 256 by 256 pixels). The size of a geographic region represented by an individual map tile may depend on the zoom level with which the map tile is associated, so that a single map tile at a lower zoom level illustrates a larger geographic area than a single map tile at a higher zoom level. The map controller 30 may generate each map tile descriptor according to a vector graphics format, and a client device, such as the client device 14 of FIG. 1, may locally generate a raster image for each tile.

With continued reference to FIG. 1, the client device 14 may include a processor 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a display or monitor device such as a touchscreen or a "regular" (output-only) screen, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

Depending on the embodiment, the client device 14 may be a personal computer, such as a desktop computer, a laptop computer, or a tablet PC, a workstation, a portable communication device such as a smartphone, or any other suitable computing device. In an embodiment, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components.

A browser application 60 may include a set of computer-readable instructions that execute on the processor 50. In general, the browser application 60 accesses web pages that include content such as text, images, embedded video, etc. and instructions in a mark-up language such as Hypertext Markup Language (HTML), and renders the content on the output device 56 according to the instructions in the mark-up language. To this end, the browser application 60 may implement functions for generating and processing data packets that conform to the Hypertext Transfer Protocol (HTTP), parse HTML content, encode data according to the Secure Socket Layer (SSL) protocol, request and verify digital certificates, etc., as well as user interface functions for receiving various user commands related to navigation, rendering, and managing web page data. In some embodiments, the browser application 60 is configured to interpret instructions in a scripting language (e.g., Javascript) provided in a web page.

A dynamic map rendering engine 62 may execute as a component of the browser application 60. However, in other embodiments, a software module similar to the map rendering engine 62 may execute as a standalone application or as a component of another application. Depending on the embodiment, the dynamic map rendering engine 62 may be a plugin (e.g., a set of compiled instructions that extends the functionality of the browser application 60 and executes on the processor 50), a script (e.g., a set of instructions in a scripting language interpreted by the browser application 60 at runtime), or another suitable software component. According to one example scenario, the dynamic map rendering engine 62 is downloaded when a user operating the client device 14 visits a web page that includes an embedded interactive map. More specifically, the web page may include a first hyperlink to an online map server and a certain geographic location as well as a second hyperlink to a copy of the dynamic map rendering engine 62, which is required for rendering map data received from the online map server according to the first hyperlink.

The dynamic map rendering engine 62 may provide interactive controls via the user interface of the browser application 60, for example. The interactive controls may allow a user to select a geographic region or area, a map type (e.g., basic, traffic, transit), a zoom level, etc. According to an example scenario, user first requests a basic map of a geographic region and then requests another type of a map for the same region. The dynamic map rendering engine 62 may request and receive map data in a vector graphics format in response to user commands.

During operation, the dynamic map rendering engine 62 may receives vector data (and, in some embodiments, style data) from the map server 12, renders the corresponding map image using the received vector data, and causes the map image to be displayed within a certain region allocated by the browser application 60. For example, the browser application 60 may create an HTML5 Canvas element for displaying map images. The dynamic map rendering engine 62 also may receive, from the map server 12, a modification indication that indicates one or more modifications to the received vector data for rendering another map image.

For simplicity, the client device 14 is illustrated with a single processor 50. However, the client device 14 in other embodiments may include additional processing units (not shown) such as a graphics processing unit (GPU) configured to facilitate image rendering on the output device 56, for example. Further, in an embodiment, the browser application 60 may utilize a library of graphics functions for efficiently generating a map image. For example, the memory 52 may store a plugin, such as an OpenGL® or Direct3D® library, having functions for rendering graphics which various applications executing on the client 14, including the browser application 60, may access via an application programming interface (API). In another embodiment, the memory 52 stores a plugin particularly suitable for browser applications, such as WebGL, for example. Also, in some embodiments, the memory 52 stores additional software components that facilitate efficient rendering of images via the output device 56. For example, the memory 52 may store an Adobe® Flash® plugin or an O3D plugin.

It is noted that, in general, the dynamic map rendering engine 62 can operate in any suitable application. For example, the client device 15 may be a portable device such as a smartphone, for example, in which the dynamic map rendering engine 62 operates in a mapping application 74. Similar to the browser application 60, the mapping application 74 may include a set of instructions stored in a memory 72 and executable on one or more processors of the client device 70 (not shown). In some implementations, the mapping application 74 utilizes networking functions provided by a browser application executing on the client device 70 (via a corresponding browser API, for example). In another implementation, the mapping application 74 includes at least partial browser functionality, such as the communication stack that supports TCP, IP, HTTP, etc. to access the map server 12.

Figure 4:
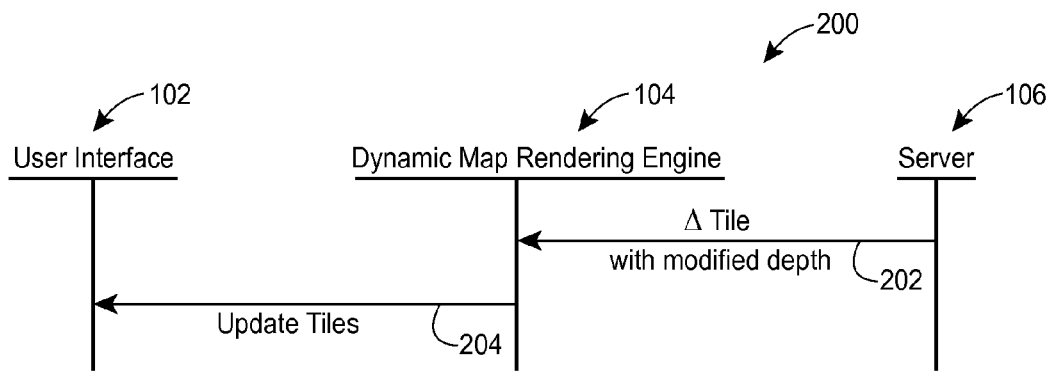
FIG. 4 is an interaction diagram that illustrates an example transfer of a single difference map tile for modifying the depth at which a set of map features or elements are rendered in a set of base map tiles.
Figure 5:
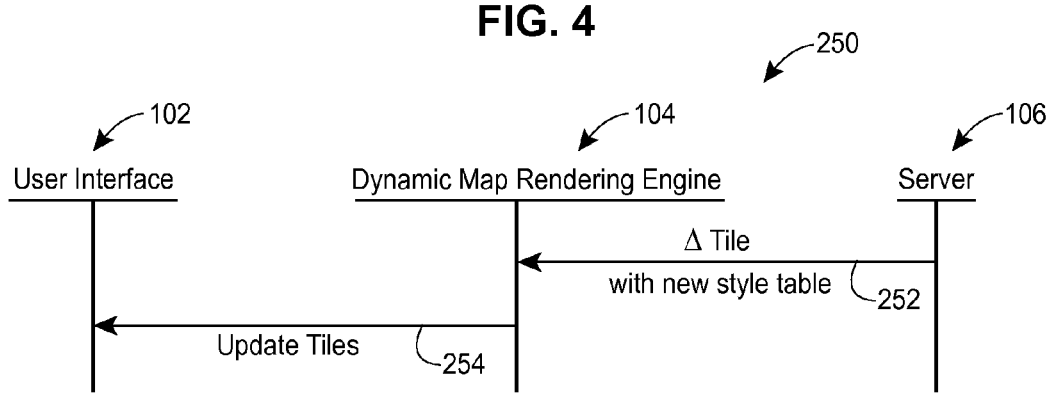
FIG. 5 is an interaction diagram that illustrates an example transfer of a difference map tile that include a new style table for a set of base map tiles.
Figure 6:
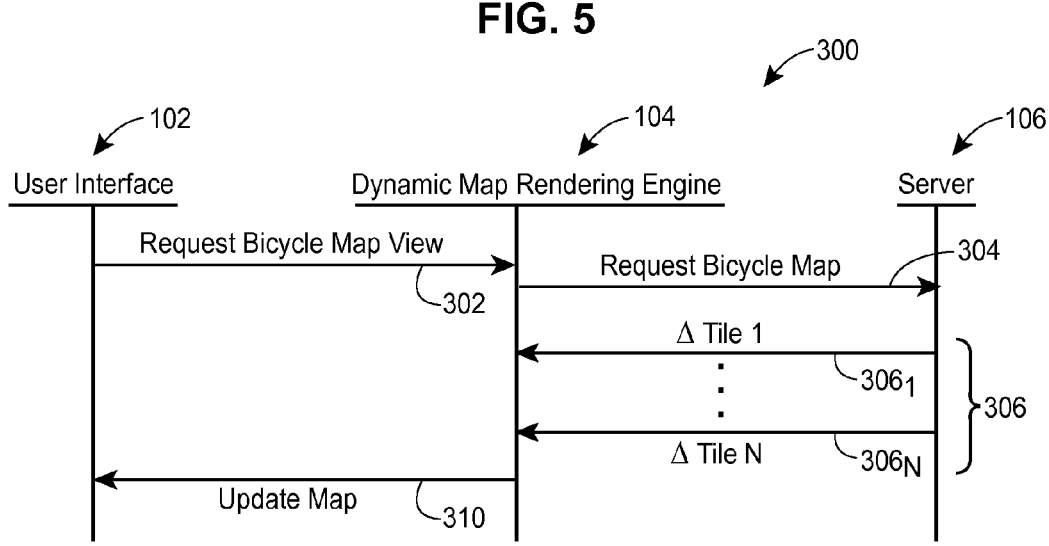
FIG. 6 is an interaction diagram that illustrates an example transfer of a second set of difference map tiles from a server device to a client device that enables the client device to change from one type of map view to another type of map view using the same set of base map tiles.

To better illustrate operation of a map server and a client device in the system of FIG. 1 or a similar environment, several scenarios are considered with reference to the interaction diagrams illustrated in FIGS. 2-6. In particular, an example exchange of information between a map server and a client device for rendering two different map images for a certain geographical region is discussed with reference to FIG. 2, followed by a discussion of several specific scenarios including providing a set of difference map tiles for rendering additional map elements and/or deleting elements from a base map view on a one to one basis with a set of base map tiles (FIG. 3), providing a single difference map tile for modifying the depth at which a map feature or element is rendered in a set of base map tiles (FIG. 4), providing one or more difference map tiles that include new style tables for a set of base map tiles (FIG. 5) and providing a second set of difference map tiles to change from one type of map view to another type of map view using the same set of base map tiles (FIG. 6).

Figure 2:
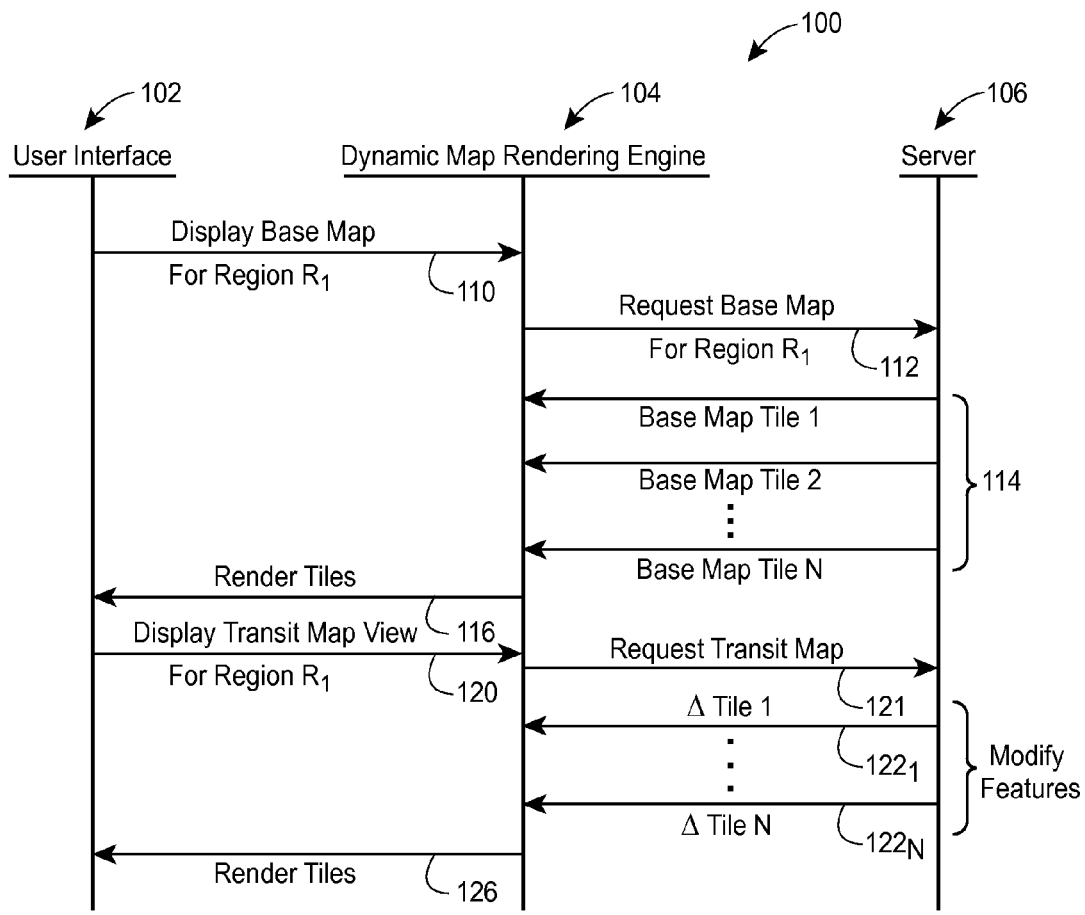
FIG. 2 is an interaction diagram that illustrates an example exchange of information for rendering map images at a client device that operates in the system of FIG. 1 to first render a base map image and to then render a transit map image using base map tiles and difference map tiles for the same geographic region.

Referring to FIG. 2, an example message exchange 100 involves a user interface 102, included in or otherwise associated with a client device (such as the client device 14 of FIG. 1), a dynamic map rendering engine 104 operating in the client device, and a server 106 (such as the map server 12 of FIG. 1). Referring back to FIG. 1, the user interface may be provided by the browser 60, while the dynamic map rendering engine 104 and the server 106 may be implemented in the components 62 and 12, respectively. In response to a user command, the user interface 102 may generate a request 110 for a basic or base map data for a certain region $R_1$ and provides the request to the dynamic map rendering engine 104. The request 110 may be transmitted as an electronic message internal to the client device in which the components 102 and 104 are implemented, for example. The dynamic map rendering engine 104 in turn may generate a request 112 for a set of base map data in the form of a set of base map tiles that cover the region $R_1$, to be transmitted via a communication network to the server 106. The request 112 may specify the region $R_1$ using Global Positioning Service (GPS) coordinates or in any other suitable manner. Further, the request 112 may include a map type indication to specify that map data is being requested for rendering a basic map or a base map view, the zoom level of the map, etc. Still further, in some embodiments, the request 102 indicates whether any vector-based map data such as base map tiles for the region $R_1$ is already available at the client device that implements the components 102 and 104.

In response to the request 112, the server 106 may generate a response 114 that includes map data in a non-raster format, such as in a vector graphics format, for rendering a basic map image. According to an example scenario, the response 114 includes a vector-based description of the base map image for the region $R_1$ that does not rely on any previously provided vector data and in particular, may be in the form of a set of base map data tiles for the region $R_1$, as stored in the base map database 18A of FIG. 1. In other words, the response 114 includes a complete description of the base map image for the region $R_1$ in the form of a set of one or more base map tiles and their associated style tables. The response 114 may include map data that is organized in any suitable manner, such as in one or several tile descriptors $T_1, T_2, \ldots T_N$. In general, map data may be provided for any number of tiles, including a single tile. For each tile, the response 112 may describe various features $F_1, F_2$, etc., each of which may be specified using one or several vector descriptors in accordance with a suitable vector graphics format (as indicated above, a feature may be associated with a single map element or a group of map elements). Features may correspond to simple map elements such as buildings or more complex groupings of map elements. In some embodiments, the response 114 may provide unique identifiers for the map features for use in future identification. The response 114 in some embodiments additionally includes style data that specifies various visual attributes of the map elements in the form of one or more style tables. In particular, a style table may be sent with each map data tile or a single style table may be sent to be used for all of the base map data tiles sent as part of the response to the request 112 for the map for the region $R_1$.

The dynamic map rendering engine 104 may render the basic map image using the base map tiles $T_1$-$T_N$ and the associated style table (e.g., a base map style table), provide the basic map image to the user interface 102 as indicated by the message 116, generate a corresponding event, and store the received base map tiles (and, when available, style data) in a memory for future use. In an embodiment, the dynamic map rendering engine 104 additionally stores an indication that the map data is associated with a base map.

In the scenario of FIG. 2, the user later decides to change the map type being displayed on the user interface 102 from a base map view or image to a transit map image or a transit map view for the same region $R_1$ without changing the geographic coordinates, and activates the appropriate control via the user interface 102. In response, the user interface 102 generates a request 120 for a transit map view and forwards the request 120 to the dynamic map rendering engine 104, which in turn provides an indication or request 121 to the server 106 that a different map image is to be rendered at the client device. In an embodiment, the indication 121 is a request for transit map data similar to the request 112. In another embodiment, the indication 121 specifically requests modification data for modifying the previously provided map data so as to render a transit map image and may indicate that the client device includes or already stores the base map tiles for the region for which the transit map view is requested. However, the dynamic rendering engine 104 may know that it already stores the base map tiles for the requested region $R_1$ and may simply request a set of difference tiles for the transit map view for that region.

In response, the server 106 creates and provides a set of one or more difference map data tiles (Δ Tile 1 to Δ Tile N) to the client device as a series of electronic messages $122_1 \ldots 122_N$ (as illustrated in FIG. 2) or as a single message. Each of the difference map tiles in the messages $122_1 \ldots 122_N$ may include one or more indications of how vector data for the corresponding base map tile $T_1 \ldots T_N$ is to be modified. In some scenarios, however, only some of the base map tiles $T \ldots T_N$ described in the response 114 are modified and, in this case, only difference tiles (Δ Tile) need to be sent for those base tiles as part of the messages $122_1 \ldots 122_N$. For example, a map tile that depicts a body of water may have the same appearance when displayed as a portion of a basic map or as a portion of a transit map and thus no difference tile may need to be generated or sent for the base map data tile(s) that depicts this body of water.

For each base map tile being modified, the message $122_i$ may provide one or more modification descriptors $M_1, M_2, \ldots M_M$. In general, a modification descriptor may specify a vector descriptor for a map elements to be added to previously provided base map data tile, identify a map element in the previously provided map data tile to be removed, specify a new value for a property of a map element in the previously provided base map data tile, etc., and may specify the operation to be performed (such as an addition, a deletion or a restyling operation). In an embodiment, each of the modification descriptors $M_1, M_2, \ldots M_M$ identifies the operation to be performed, such as add, delete, modify, modify depth, etc., and also includes one or more operands or parameters such as a vector descriptor for a map feature or map element being added, an identifier of a map feature or map element being removed, etc.

Upon receiving the messages $122_1 \ldots 122_N$ and the associated difference map data tiles (Δ Tile i), the dynamic map rendering engine 104 map renders the tiles for the requested transit map image using some or all of the vector data provided in the response 114 (i.e., the base map data tiles) and the modification indications provided as part of the difference map tiles in the messages $122_1 \ldots 122_N$. More specifically, the dynamic map rendering engine 104 may interpret the previously provided vector descriptors, modified according to the messages $122_1 \ldots 122_N$, to render a raster transit map image, and generate an event 126 to cause the transit map image to be rendered via the user interface 102. The dynamic map rendering engine 104 may also store the modified map data in the memory. Generally speaking, the dynamic map rendering engine 104 stores both the originally provided base map data tiles and the modified map data tiles.

While the example message exchange diagram 100 of FIG. 2 illustrates the base map tiles and the difference map tiles being sent in response to separate messages or requests from the client device, the base map tiles and the difference map tiles could be sent from the server 106 to the dynamic map rendering engine 104 of the client device in response to a map request for a single map view. For example, if the initial request 110 of FIG. 2 were for the transit map view for a geographic region for which the client device had not yet received and stored a set of base map tiles, the server 106 would respond to the request by sending both the base map tiles and the difference map tiles for the transit map view associated with the geographic region.

Still further, as another example, the client device may send a request for map data to the server in a manner that enables the rendering of the digital map on the user interface to be personalized using the personalized map data stored in, for example, the map database services 18E of FIG. 1. Here, the server may recognize the user or client device (by user logon, device ID, etc.) as having personalized data (preferences, styles, added data, default map views, etc.) and may generate one or more difference tiles that implement a personalized map view for the user using the standard base tiles for a geographic region. The server may then send both the base map data tiles and the personalized difference tiles (either together or separately) for the region to enable the client device to render a personalized map for the region in the manners discussed herein. In some cases, the personalized difference tiles may be the same as the difference tiles for other map views when, for example, a personalized map preference specifies the use of a particular map view (e.g., a transit map view) as the default map view. Personalized difference tiles may be created for specific map regions or may be applied to any or all map regions, based on the personalized settings stored for the user. In some cases, the client device may store the personalized preferences and send indications of these preferences to the server which may then process these preferences to generate difference tiles that, when applied to the base map tiles at the client device, create the personalized map view at the client device.

Figure 3:
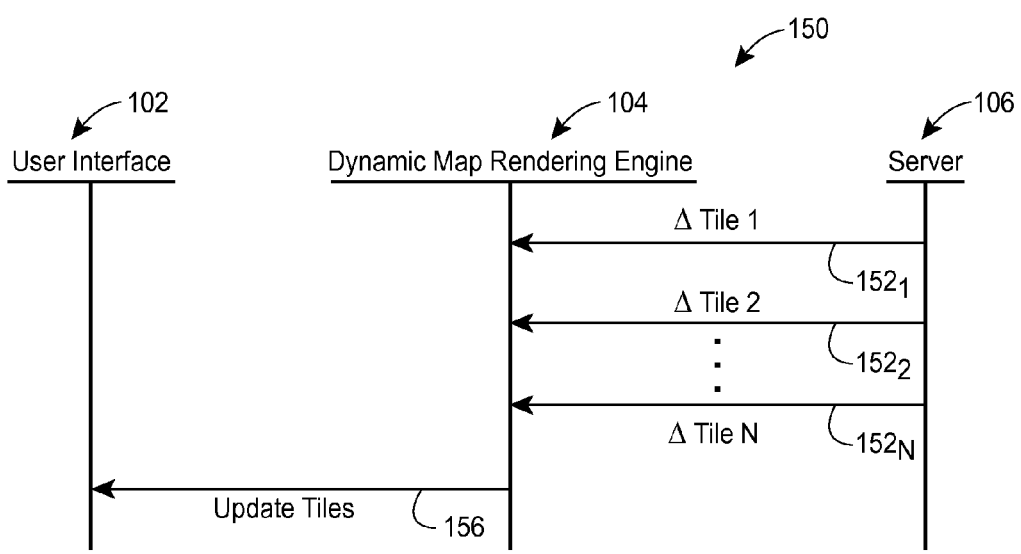
FIG. 3 is an interaction diagram that illustrates an example transfer of difference map tiles for rendering additional map elements and deleting elements from a base map view.

During an example message exchange 150 illustrated in FIG. 3, the map server 106 provides difference map tiles including vector descriptors of map features to be added and/or of map features to be deleted from a set of base map tiles to the dynamic map rendering engine 104 via respective messages $152_1 \ldots 152_N$. In this case, a difference map tile is sent on a one to one basis for each base map tile to be changed or modified in some manner. The map feature operations specified in the difference map tiles are used with some or all of previously provided base map data tiles to render a new map image at the client device that implements the user interface 102 and the dynamic map rendering engine 104. In this case, the difference map data tiles in the messages $152_1 \ldots 152_N$ may describe additions to a set of base map data tiles or deletions from the set of base map data tiles already provided to the client device and each of the difference map tiles within each of the messages $152_1 \ldots 152_N$ may be associated with one and only one base map tile so as to define the differences or changes to be made to the vector graphics data within that base map tile.

In any case, each of the difference tiles within the message $152_1 \ldots 152_N$ may include a description, in a vector graphics format or other suitable non-raster format, of a map feature having one or more map elements. A message 152 also may include, for example, a depth or level indication that specifies how the corresponding map feature is rendered relative to another map feature or element disposed at approximately the same location. For example, a new map feature added via one of the difference tiles in the messages $152_1 \ldots 152_N$ may be a segment of railroad tracks, and the previously provided base tile may include a map feature that is a segment of a road. Depending on the respective depth indications of the new map feature and the previously provided map feature, the segment of the railroad tracks may be rendered over or under the segment of the road at the point where the railroad tracks and road intersect.

Upon receiving the difference map data tiles in the messages $152_1 \ldots 152_N$, the dynamic map rendering engine 104 may render a new map image and generate an event 156 so as to cause the new map image to be displayed at the user interface 102. In an embodiment, the dynamic map rendering engine 104 also stores the augmented map data in a memory as a new version of map data while continuing to store the original base map data tiles as well as the difference map tiles for the map view being displayed.

Referring to FIG. 4, an example message exchange 200 may occur when the server 106 determines that a certain map feature included in previously provided map data is rendered in a new map image or new map view at a new depth or having some other feature change. The server 106 may generate and transmit to the dynamic map rendering engine 104 a modification indication 202 in the form of a single difference map tile that indicates, for one or more map features identified by unique feature identifiers, a change that includes information about, for example, the new depth at which the map features are to be rendered in one or more base map data tiles. In another embodiment, the difference map tile sent in the message 202 indicates new depth values for several map features or elements which may be in the same base map tile or different base map tiles. Thus, in this example, a single difference tile may be associated with multiple base tiles. Upon receiving the modification indications as part of the difference tile sent within the message 202, the dynamic map rendering engine 104 may render a new map image in view of the modification indications and the base map tiles and generate an event 204 so as to cause the new map image to be displayed at the user interface 102.

Further, an example message exchange 250 of FIG. 5 may occur when the server 106 determines that certain map features included in previously provided map data should be rendered with different styles, such as using different colors, different line widths, different thickness or other types of style characteristics. In this case, the server 106 may generate and transmit to the dynamic map rendering engine 104 a single modification indication 252 in the form of a single difference map tile that includes a new style table or a new indication of the styles that are to be applied to one or more of the base map tiles already at the client device. In another embodiment, the server 106 may send a multiplicity of difference map tiles, each including a new set of style data or a new style table for a corresponding one of the base map data tiles already at the client device to affect a style change at the client device. Upon receiving the modification indication 252 in the form of a difference map tile having a new style table or changes to a style table, the dynamic map rendering engine 104 may render a new map image using the base map data tiles and the new style table(s) within the difference tile(s) and generate an event 254 so as to cause the new map image to be displayed at the user interface 102.

FIG. 6 illustrates an example message exchange 300 during which the server 106 provides modification data in the form of difference map tiles to the dynamic map rendering engine 104 for modifying a map image being displayed on the client device to include a new map view for a region $R_1$ when the map view currently being displayed is already modified map view, e.g., one that is modified from the base map view associated with a set of base map tiles. For example, the message exchange 300 of FIG. 6 may occur at the end of the message exchange 100 of FIG. 2 when the user of the client device selects to view a bicycle map view of the map region when the client device is currently illustrating the transit map view for the region. In this case, the user may select to view a bicycle map view instead of the transit map view for the map region $R_1$. Here, the user activates the appropriate control via the user interface 102 for the bicycle map view. In response, the user interface 102 generates a request 302 for a bicycle map view and forwards the request 302 to the dynamic map rendering engine 104, which in turn provides an indication or request 304 to the server 106 that a different map image is to be rendered at the client device. The indication 304 may be a request for bicycle map data and may specify the base map tiles already provided to the client device. Alternatively, the dynamic map rendering engine 104 may know that it already has the base map tiles for the requested region stored in memory and may just request the difference map tiles for the bicycle map view for that region.

In response, the server 106 provides a set of one or more difference map data tiles to the client device as a series of electronic messages $306_1 \ldots 306_N$ (as illustrated in FIG. 6) or as a single message. Each of the difference tiles within the messages $306_1 \ldots 306_N$ may include one or more indications of how vector data for the corresponding base map data tile $T_1 \ldots T_N$ is to be modified. In some scenarios, however, only some of the tiles $T_1 \ldots T_N$ previously sent to the client device are to be modified and in these cases, difference map tiles for only those tiles need to be sent to the client device.

For each tile being modified, a difference tile within the message 306, may provide one or more modification descriptors $M_1, M_2, \ldots M_M$ which may specify a vector descriptor for map elements to be added to previously provided base map data tiles, identify a map element in the previously provided map tiles to be removed, specify a new value for a property of a map element in the previously provided base map tiles, specify a new set of style data or a style table, etc.

Upon receiving the difference map tiles in the messages $306_1 \ldots 306_N$, the dynamic map rendering engine 104 renders the tiles for the requested bicycle map image using some or all of the vector data provided in the response 114 (i.e., the base map data tiles) of FIG. 2 and the modification indications provided in the messages $306_1 \ldots 306_N$ as difference map tiles. More specifically, the dynamic map rendering engine 104 may interpret the previously provided vector descriptors, modified according to the messages $306_1 \ldots 306_N$, to render a raster bicycle map image, and generate an event to cause the bicycle map image view to be rendered via the user interface 102. The dynamic map rendering engine 104 may also store the modified map data in the memory. Generally speaking, the dynamic map rendering engine 104 continues to store both the originally provided base map data tiles and the modified map data tiles for the bicycle view but may eliminate or not store the difference tiles for the transit map view is so desired.

Next, several example methods that may be implemented in computing devices operating in the system of FIG. 1 or a similar environment are discussed with reference to FIGS. 7-9. These methods may be implemented as computer programs developed in any suitable programming language and stored on the tangible, non-transitory computer-readable medium (such as one or several hard disk drives) and executable on one or several processors. For example, the methods of FIGS. 7 and 8 may be implemented in the map server 12, and the method of FIG. 9 may be implemented in the client device 14. Although the methods of FIGS. 7-9 can be executed on individual computers, such as servers or personal computers (PCs), it is also possible to implement at least some of these methods in a distributed manner using several computers, e.g., in a cloud computing environment.

Figure 7:
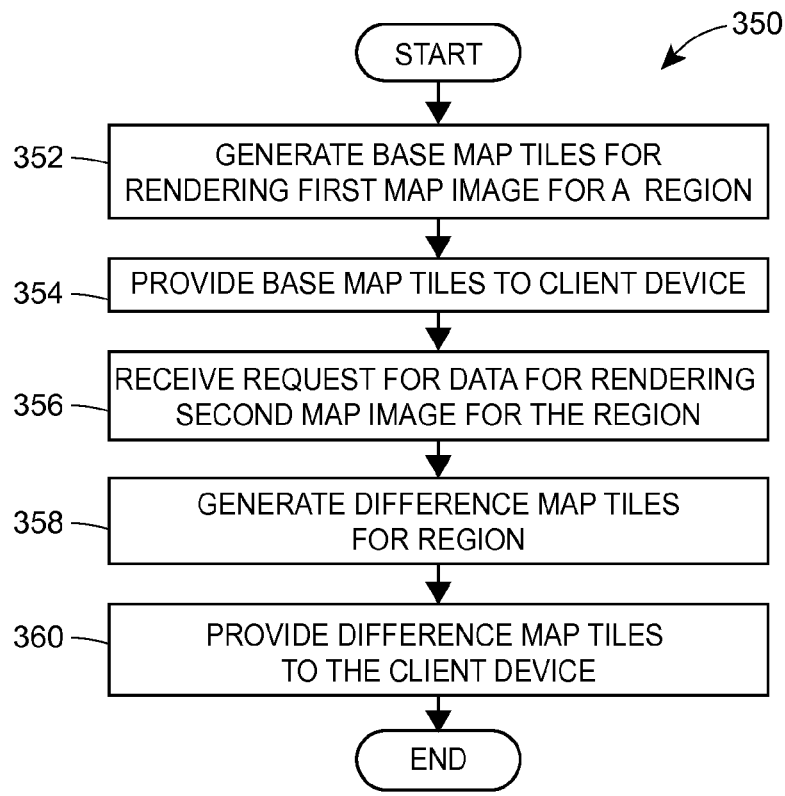
FIG. 7 is a flow diagram of an example method for generating map data for several map images at a map server using base map tiles and difference map tiles that may operate in the system of FIG. 1.

Referring first to FIG. 7, an example method 350 for generating map data for several map images may be implemented in the map controller 30 of the map server 12 or a similar component of the server 106, for example. According to an embodiment, vector descriptors for rendering a first map image for a certain region are generated at block 352 as a set of base map tiles. The vector descriptors or base map tiles may conform to a vector graphics format and describe respective map elements. In some embodiments, the vector descriptors may be grouped according to map features, each including one or more map elements. Further, in some embodiments, the vector descriptors may be provided as a part of non-raster map data that also includes style data in the form of, for example, a style table, for efficiently rendering and re-rendering vector data, text-based label data, icons or symbols such as road shields, etc.

Next, at block 354, the base map tiles are provided to a client device as one or more messages. At a block 356, a request for data for rendering a second map image for the same region is received. In some scenarios, the request is transmitted in response to the user selecting a different map type at the client device, as illustrated in the interaction diagram in FIG. 2, for example. A modification indication in the form of a set of difference map tiles, each of which includes a description of one or several modifications to the previously provided base map tiles, is generated at a block 358 and provided to the client device at a block 360. While the request for a new map view 356 is indicated as being received after the base map tiles for the region of the requested map view have been sent to the client device, this request could be received before the base map tiles are sent to the client device so that both the base map tiles (block 354) and difference map tiles (360) for the region are sent to the client device in response to the same map image request.

In another scenario, the request received at the block 356 is transmitted in response to the user selecting a new zoom level at which the map image corresponding to the same region and the same map type is to be rendered. For example, the vector descriptors generated at block 352 may describe several tiles at zoom level $Z_1$ of a basic map type for a geographic region R. After the user selects the zoom level $Z_2$ and an appropriate request for data is issued at the block 356, a modification indication or set of difference map tiles may be generated and provided to the client device at blocks 358 and 360, respectively. The client device may add, remove, or modify the previously provided vector descriptors in accordance with the difference map tiles, as well as re-scale some or all of the vector descriptors to render the corresponding map elements at the zoom level $Z_2$. As a more specific example, the vector descriptors provided at the block 354 may include a vector-based description of a park at zoom level $Z_1$, and the same vector-based description of the park may be used to re-render the park at zoom level $Z_2$ as a part of the modified map image.

Figure 8:
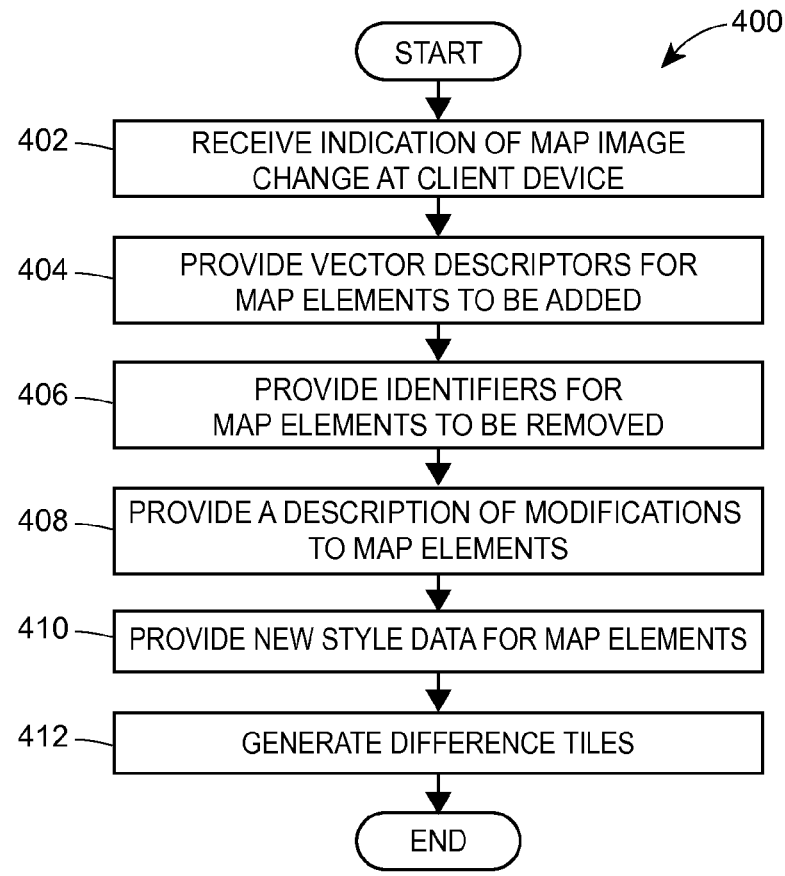
FIG. 8 is a flow diagram of an example method for generating a set of difference map tiles for the modification of previously provided base map tiles at a map server that may operate in the system of FIG. 1.

FIG. 8 illustrates an example method 400 for generating a difference map tile for previously provided map data that may be implemented in the map controller 30 of the map server 12 or in a similar component of the server 106, for example. In an embodiment, at least some of the steps of method 400 are executed at blocks 356-360 of the method 350 discussed above.

At a block 402, an indication is received that a map image is to be updated at or sent to the client device. Additions to the previously provided vector descriptors in the form of base map tiles are identified, and the corresponding descriptions are generated, at a block 404. At a block 406, deletions of some of the previously provided vector descriptors are identified, and the corresponding descriptions of modifications are generated. As discussed above, modifications of certain map features in some scenarios are represented as deletions and additions of some of the sub-features. In some cases, these difference descriptions may be generated by comparing vector graphics or raster data for the set of base map tiles to the new map tiles for the new map view to generate differences, or from messages sent from various other databases that store data for the new view, such as the databases 18B-18D of FIG. 1. In any case, the modification indications, such as a description of modifications to the vector data (e.g., changing of depth or level indications, labels, etc.), are generated and compiled at a block 408. A block 410 may also create a new style table for each set of map elements to render the features of the base map tiles using different style characteristics. Thereafter, at a block 412, a set of difference map tiles are created defining the additions, deletions, changes and styles to be applied to the base map tiles for use in rendering the new map image or map view. These difference tiles may then be transmitted to the client device as a single electronic message or as several electronic messages.

Figure 9:
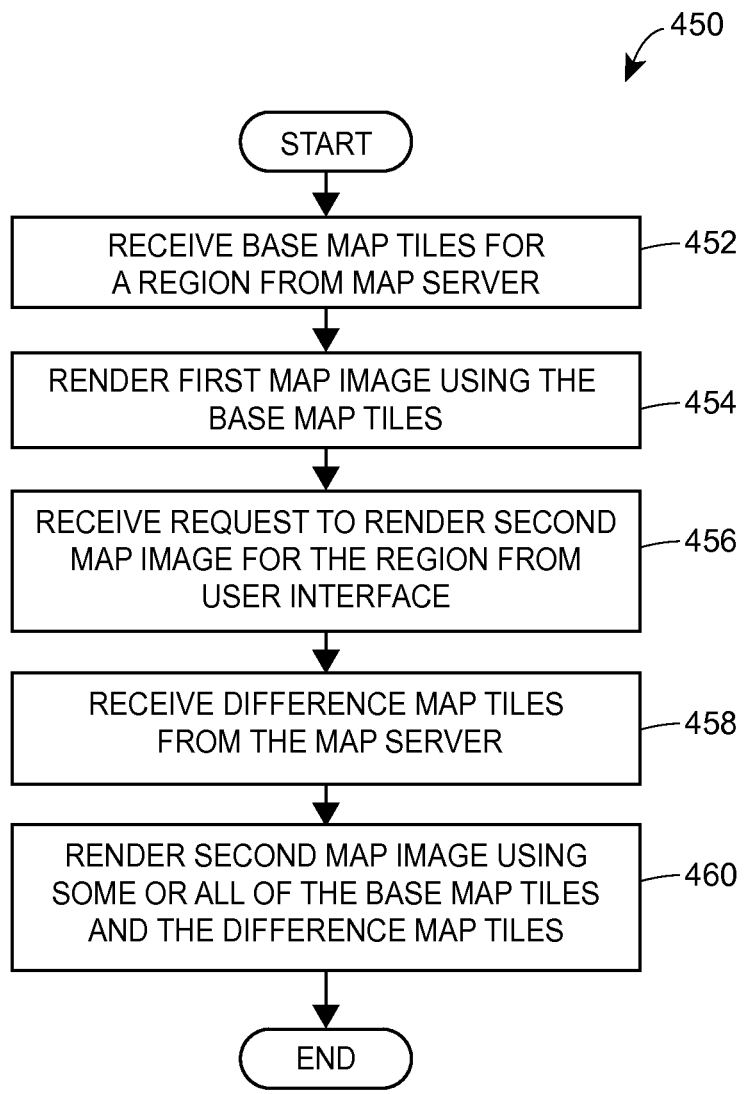
FIG. 9 is a flow diagram of an example method for rendering map images at a client device using base map tiles and difference map tiles that may operate in the system of FIG. 1.

FIG. 9 is a flow diagram of an example method 450 for rendering map images that may be implemented in the dynamic map rendering engine 62 or 104, for example. At a block 452, vector descriptors for a certain area or region are received as a set of base map data tiles, and a first map image is rendered using the received vector descriptors at block 454. To this end, the received vector data may be interpreted to generate a raster image.

Next, at block 456, a request to render a second map image is received from the user interface such as the interface of a browser application, for example. The second map image may be for the same region but may correspond to a different map type, view, or zoom level, as discussed above. A modification indication, such as a set of difference tiles modifying the previously received and stored base map tiles is received at a block 458. The second map image is then rendered using some or all of the vector descriptors received at the block 452 as base map data tiles and the difference map tiles received at the block 458. As discussed above, modifications to vector data within the difference map tiles in general may include additions, deletions, modifications, changes in depth, new styles, etc.

To further illustrate an example application of the techniques discussed above, FIGS. 10A, 10B and 10C illustrate maps that correspond to the same geographic region and are displayed according to the base map type, a transit map type, and a bicycle map type respectively. A map image 500 of a base map, depicted in FIG. 10A, may include a rendering of multiple map elements such as roads and parks as defined by the set of base map data tiles including the base labels and base style data or style tables corresponding to the illustrated region.

Figure 10A:
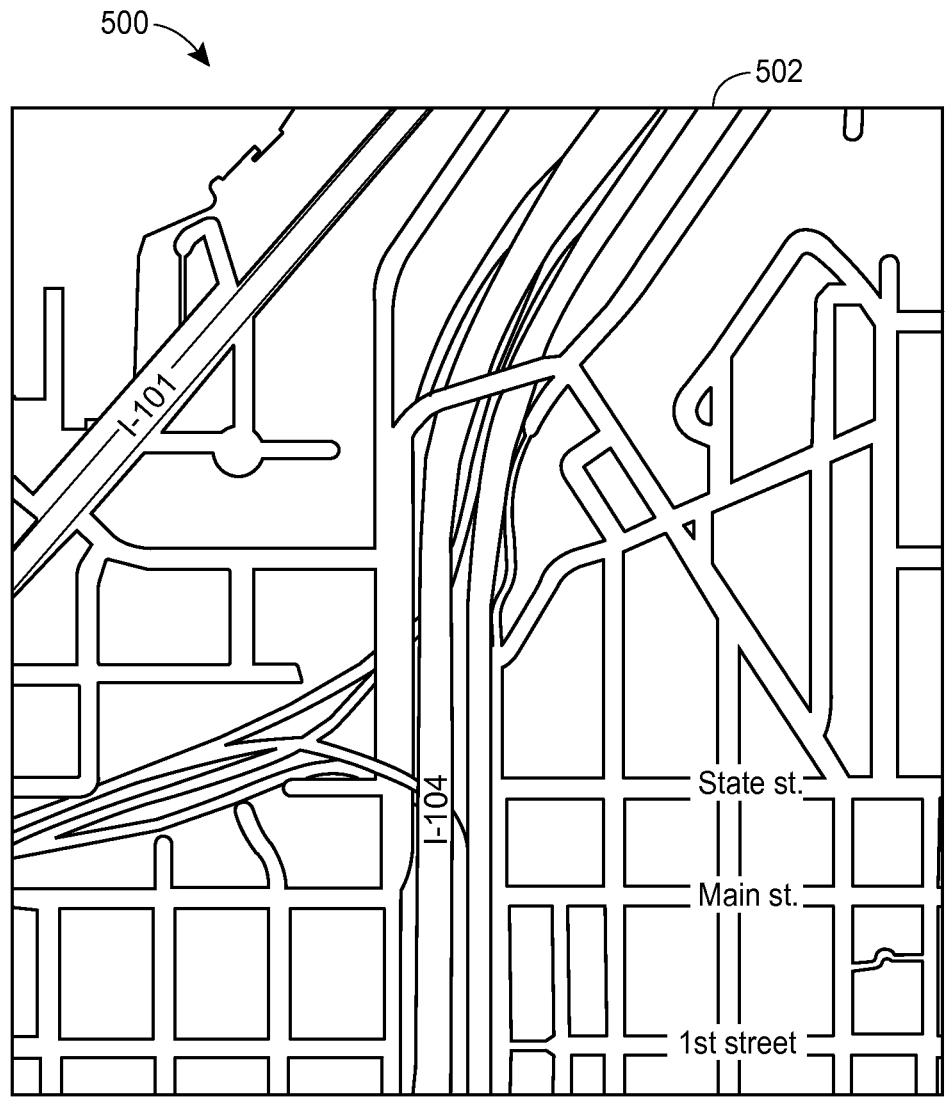
FIG. 10A is an example base map that may be displayed at a client device operating in the system of FIG. 1 using a set of base map tiles.
Figure 10B:
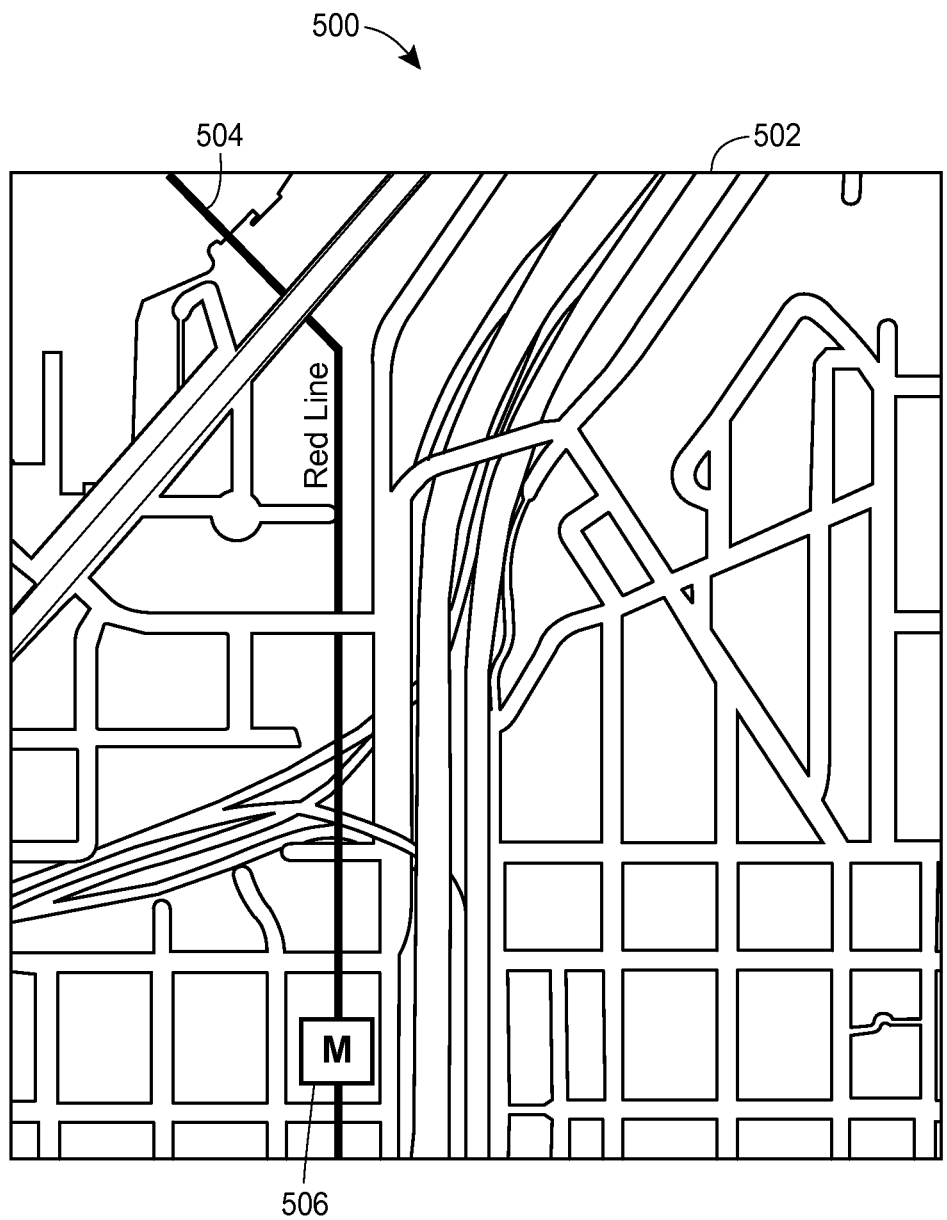
FIG. 10B is an example transit map that may be displayed after a user selects, via an interactive user interface, a transit map type at a client device created from the set of base map tiles used in FIG. 10A and difference map tiles for a transit map view.

As illustrated in FIG. 10B, the map image of a transit map may include the map elements of the map image 500 as well as a subway line 504 superimposed on or otherwise integrated within the corresponding portions of the map image 500. Depending on the embodiment, the subway line 504 may be defined as a single map feature or as several map features in the same or different map tiles, each corresponding to a respective section of the tracks. Further, a subway symbol 506 may be rendered over a portion of the map image 500. Additionally, labels for the subway line (the Red Line) may be provided on the transmit map view and, while not shown, various labels for roads in the base map view may be deleted. Depending on the embodiment, the subway symbol 506 may be provided as an added map feature or element, as a label, or as an icon, for example. In an embodiment, the subway symbol 506 is specified as a universal resource locator (URL) that can be used to retrieved a standard subway symbol in a raster format from a server that generates standard icons.

To generate the map image of FIG. 10B at a client device after the map image of FIG. 10A has been rendered at the client device, a map server may provide only a set of difference map tiles having the modifications that describe, in a vector format for example, the one or more map features corresponding to the subway line 504 and any associated changes, which may include changes to the labels, style data or style table that changes the manner in which various visual features, such as line widths, colors, etc. for various features are rendered. In an embodiment, the modification indication or difference map tiles may also provide a depth indication to cause the subway line 504 to appear under some of the roads depicted in the map image of FIG. 10A and over some of the other roads in the map image of FIG. 10A. Further, in an embodiment, the difference map tiles additionally include a description of the subway symbol 506 as a label or an icon.

Figure 10C:
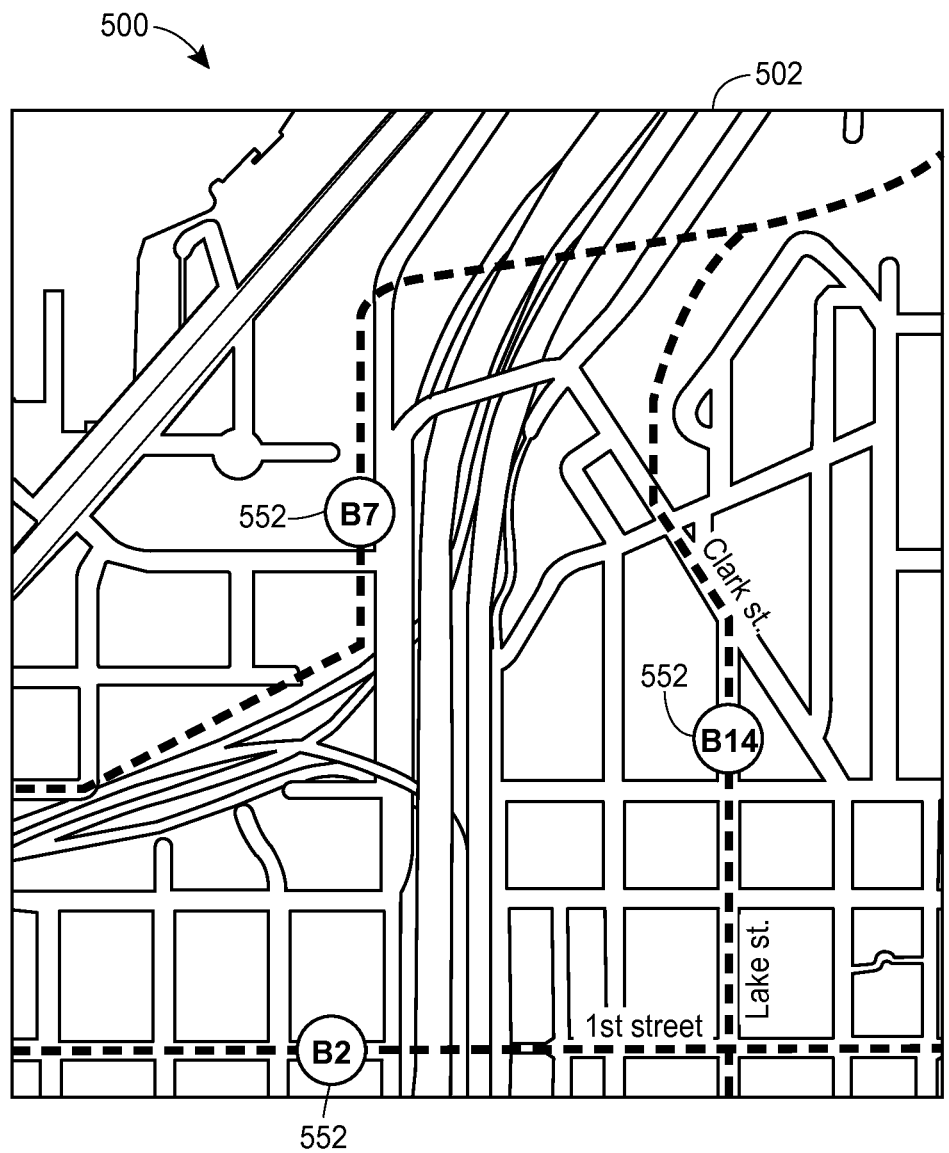
FIG. 10C is an example bicycle map that may be displayed after a user selects, via an interactive user interface, the bicycle map type at the client device created from the set of base map tiles used in FIG. 10A and difference map tiles for a bicycle map view.

As illustrated in FIG. 10C, the map image of a bicycle map 550 may include the map elements of the map image 500 as well as a set of bicycle paths superimposed on or otherwise integrated within the corresponding portions of the map image 500. Here, however, the transit information is removed (or actually deleted in the rendering process). Depending on the embodiment, bicycle paths may be defined as a single map feature or several map features disposed in various difference map data tiles, each corresponding to a respective section of the map or to a base map data tile of the base map image of FIG. 10A. Further, bicycle path symbols 552 may be rendered over a portion of the map image 500. Depending on the embodiment, the symbols 552 may be provided as an added map feature or element, as a label, or as an icon, for example. In an embodiment, one or more of the symbols 552 may be specified as a universal resource locator (URL) that can be used to retrieved a standard bicycle path symbol in a raster format from a server that generates standard icons.

To generate the map image of FIG. 10C at a client device after the map image of FIG. 10A has been rendered and/or after the map image of FIG. 10B has been rendered at the client device using difference map tiles to modify the map image of FIG. 10A, a map server may provide only a set of difference map tiles having the modifications that describe, in a vector format for example, the one or more map features corresponding to the bicycle view 550 and any associated changes to the base map tiles to produce the bicycle view. In an embodiment, the modification indication or difference map tiles for the bicycle view may also provide a depth indication to cause the bicycle paths 552 to appear over some are all of the roads depicted in the map image of FIG. 10A. Further, in an embodiment, various of the difference map tiles for the bicycle view may include a description of the bicycle path symbols 552 as a label or as an icon and these or other difference map tiles may provide a new style table that de-emphasizes the road and emphasizes the bicycle paths in the map of FIG. 10C.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing map data to a client device via a communication network, the method comprising:

generating one or more base map tiles, each base map tile including a plurality of vector descriptors for rendering and displaying, at the client device, a first map image for a selected geographic region, wherein the first map image corresponds to a first zoom level, wherein each vector descriptor indicates a geometry of a respective map element in accordance with a vector graphics format, including generating a set of style data defining visual characteristics to be applied to the geometry of at least some of the plurality of vector descriptors;

causing the one or more base map tiles to be transmitted to the client device via the communication network;

receiving an indication that a second map image for the selected geographic region is to be rendered at the client device, wherein the second map image is different from the first map image but includes a region covered by at least one of the base map tiles, and wherein the second map image corresponds to a second zoom level different than the first zoom level;

generating a set of difference map tiles that define a difference between the first map image and the second map image to be displayed, including specifying map features associated with the second zoom level, the set of difference map tiles including one or more descriptors, each of which corresponds to a change in a map element as rendered in the second map image as compared to the first map image, including generating a different set of style data defining different visual characteristics to be applied to the geometry of the at least some of the plurality of vector descriptors; and causing the set of difference map tiles to be transmitted to the client device via the communication network for rendering and displaying the second map image using at least some of the information in the one or more base map tiles and the set of difference map tiles.

2. The method of claim 1, wherein generating the set of difference map tiles includes:

identifying a map element that is not included as a part of the first map image but is to be rendered as a part of the second map image;

providing, in the set of difference map tiles, a vector descriptor corresponding to the identified map element; and providing, in the set of difference map tiles, an add indication corresponding to the identified map element to indicate that the identified map element is to be rendered in the second map image using the provided vector.

3. The method of claim 2, wherein generating the set of difference map tiles further includes providing, in the set of difference map tiles, a depth indication corresponding to the identified map element, wherein the depth indication indicates an order in which the identified map element is to be rendered within an area that also includes at least one other map element, and wherein the identified map element and the at least one other map element overlap.

4. The method of claim 1, wherein generating the set of difference map tiles includes:

identifying a map element that is included as a part of the first map image but is not to be rendered as a part of the second map image, wherein the identified map element corresponds to one of the plurality of vector descriptors transmitted to the client device as part of one of the base map tiles for the first map image;

providing, in the set of difference map tiles, an identifier of the one of the plurality of vector descriptors that corresponds to the identified map element; and providing, in the set of difference map tiles, a remove indication to indicate that the identified map element is not to be rendered in the second map image.

5. The method of claim 1, wherein generating a set of style data for the one or more base map tiles includes generating a style table for each of the one or more base map tiles and wherein generating the set of difference map tiles includes generating a new style table for each of the set of difference map tiles that is different than the style tables for the base map tiles.

6. The method of claim 1, wherein generating the one or more base map tiles includes obtaining the base map tiles from a first database, and wherein generating the set of difference map tiles includes obtaining a set of change data from a second database defining a new map view of the geographical region defined for the one or more base map tiles and using the set of change data from the second database to generate the set of difference map tiles.

7. The method of claim 1, wherein generating the one or more base map tiles includes generating a plurality of base map tiles for a geographical region and wherein generating the set of difference map tiles includes generating a separate difference map tile for each of the plurality of base map tiles.

8. A computer-implemented method for providing map data to a client device via a communication network, the method comprising:

generating one or more base map tiles, each base map tile including a plurality of vector descriptors associated with a first map image for a selected geographic region, wherein each vector descriptor indicates a geometry of a respective map element in accordance with a vector graphics format, including generating a set of style data defining visual characteristics to be applied to the geometry of at least some of the plurality of vector descriptors;

generating a set of difference map tiles that define a difference between the first map image and the second map image to be displayed at a client device, the set of difference map tiles including one or more descriptors, each of which corresponds to a change in a map element as rendered in the second map image as compared to the first map image, including generating a different set of style data defining different visual characteristics to be applied to the geometry of the at least some of the plurality of vector descriptors, including obtaining one or more personalized settings associated with a map request defining a personalized map view and generating a set of difference tiles that implement the personalized map view from the one or more base map tiles;

causing the one or more base map tiles to be transmitted to the client device via the communication network; and causing the set of difference map tiles to be transmitted to the client device via the communication network for rendering and displaying the second map image using at least some of the information in the one or more base map tiles and the set of difference map tiles.

9. The method of claim 8, wherein generating the set of difference map tiles includes:

identifying a map element that is not included as a part of the first map image but is to be rendered as a part of the second map image;

providing, in the set of difference map tiles, a vector descriptor corresponding to the identified map element; and providing, in the set of difference map tiles, an add indication corresponding to the identified map element to indicate that the identified map element is to be rendered in the second map image using the provided vector.

10. The method of claim 8, wherein generating the set of difference map tiles includes:

identifying a map element that is included as a part of the first map image but is not to be rendered as a part of the second map image, wherein the identified map element corresponds to one of the plurality of vector descriptors transmitted to the client device as part of one of the base map tiles associated with the first map image;

providing, in the set of difference map tiles, an identifier of the one of the plurality of vector descriptors that corresponds to the identified map element; and providing, in the set of difference map tiles, a remove indication to indicate that the identified map element is not to be rendered in the second map image.

11. The method of claim 8, wherein generating a set of style data for the one or more base map tiles includes generating a style table for each of the one or more base map tiles and wherein generating the set of difference map tiles includes generating a new style table for each of the difference map tiles that is different than the style tables for the base map tiles.

12. The method of claim 8, wherein generating the one or more base map tiles includes generating a plurality of base map tiles for a geographical region and wherein generating the difference map tile includes generating a separate difference map tile for each of the plurality of base map tiles.

13. The method of claim 8, further including storing the one or more personalized settings at a server device.

14. A tangible non-transitory computer-readable medium having instructions stored thereon that, when executed by one or more processors, cause the one or more processors to:

receive, from a client device, an indication that a particular map image for a selected geographic region is to be rendered at the client device;

define one or more base map tiles for the selected geographic region, each base map tile including a plurality of vector descriptors associated with a first map image for the selected geographic region, wherein each vector descriptor indicates a geometry of a respective map element in accordance with a vector graphics format, including generate a set of style data defining visual characteristics to be applied to the geometry of at least some of the plurality of vector descriptors;

generate a set of difference map tiles that define a difference between the first map image and the particular map image to be rendered at a client device, the set of difference map tiles including one or more descriptors, each of which corresponds to a change in a map element as rendered in the particular map image as compared to the first map image, including generate a different set of style data defining different visual characteristics to be applied to the geometry of the at least some of the plurality of vector descriptors, wherein set of difference map tiles describes at least one of:

(i) a new map element, not included in first map image, to be rendered in conjunction with at least some of the map data to generate the particular map image, (ii) a map element included in the first map image that is not to be rendered when generating the particular map image, and (iii) a map element, included in the first map image and to rendered in the first map image according to a first style, that is instead to be rendered in the particular map image according to a second style; and cause the set of difference map tiles to be transmitted to the client device via the communication network for rendering and displaying the particular map image using at least some of the information in the one or more base map tiles and the set of difference map tiles.

15. The computer-readable medium of claim 14, wherein the instructions further generate the set of base map tiles in a non-raster format for a selected geographic region, and cause the set of base map tiles to be transmitted to the client device.

16. The computer-readable medium of claim 14, wherein defining the set of style data for the one or more base map tiles includes defining a style table for each of the one or more base map tiles and wherein generating the set of difference map tiles includes generating a new style table for each of the difference map tiles that is different than the style tables for the base map tiles.

17. The computer-readable medium of claim 14, wherein defining the one or more base map tiles includes obtaining the base map tiles from a first database, and wherein generating the set of difference map tiles includes obtaining a set of data from a second database defining a different map view of the selected geographical region defined for the one or more base map tiles and using the set of data from the second database to generate the set of difference map tiles.

18. The computer-readable medium of claim 14, wherein defining the one or more base map tiles includes defining a plurality of base map tiles for a geographical region and wherein generating the set of difference map tiles includes generating a separate difference map tile for each of the plurality of base map tiles.

19. The computer-readable medium of claim 14, wherein generating a set of difference map tiles that define a difference between the first map image and the particular map image includes obtaining one or more personalized settings associated with a map request defining a personalized map view and generating a set of difference tiles that implement the personalized map view from the one or more base map tiles.

20. A method for implementation in a computing device for generating map images, the method comprising:

receiving, via a communication network, a plurality of base map tiles associated with a first map image for a selected geographic region, each base map tile including one or more vector descriptors that indicates a geometry of a respective map element in accordance with a vector graphics format, including receiving a set of style data defining visual characteristics to be applied to the geometry of at least some of the plurality of vector descriptors;

receiving, via the communication network, a set of difference map tiles for rendering a second map image for the selected geographic region, including receiving a separate difference map tile for each of the received plurality of base map tiles, each of the set of difference map tiles including one or more indications of a modification of a vector descriptor to be applied in one of the plurality of base map tiles, including receiving a different set of style data defining different visual characteristics to be applied to the geometry of the at least some of the plurality of vector descriptors;

rendering the second map image using the plurality of base map tiles and the set of difference map tiles; and causing the second map image to be displayed via a user interface.

21. The method of claim 20, wherein receiving the set of difference map tiles includes receiving a difference map tile including an additional vector descriptor not included in the plurality of vector descriptors in the plurality of base map tiles, wherein the additional vector descriptor corresponds to a map element rendered as a part of the second map image but not as a part of the first map image.

22. The method of claim 21, wherein receiving the set of difference map tiles further includes receiving a label corresponding to the additional vector descriptor, wherein the label includes text to be rendered along as a part of the second map image along with the map element.

23. The method of claim 20, wherein receiving the set of difference map tiles includes receiving an indication that one of the plurality of vector descriptors in the plurality of base map tiles is not used in rendering the second map image.

24. The method of claim 20, wherein receiving the set of style data for includes receiving a style table for each of the one or more base map tiles and wherein receiving the set of difference map tiles includes receiving a new style table for each of the difference map tiles that is different than the style tables for the base map tiles.

25. The method of claim 20, further including obtaining one or more personalized settings associated with a map request defining a personalized map view and wherein receiving a set of difference map tiles for rendering a second map image includes receiving a set of difference tiles that implement the personalized map view from the plurality of base map tiles.

26. The method of claim 1, wherein the visual characteristics include one or more of (i) width in pixels, (ii) line color, (iii) line shading, or (iv) fill color.

27. The method of claim 8, wherein the visual characteristics include one or more of (i) width in pixels, (ii) line color, (iii) line shading, or (iv) fill color.

28. The computer-readable medium of claim 14, wherein the visual characteristics include one or more of (i) width in pixels, (ii) line color, (iii) line shading, or (iv) fill color.

29. The method of claim 20, wherein the visual characteristics include one or more of (i) width in pixels, (ii) line color, (iii) line shading, or (iv) fill color.

* * * * *